US010618363B2

(12) United States Patent
Iguchi et al.

(10) Patent No.: US 10,618,363 B2
(45) Date of Patent: Apr. 14, 2020

(54) TORSION BEAM MANUFACTURING METHOD AND TORSION BEAM MANUFACTURING APPARATUS

(71) Applicant: NIPPON STEEL & SUMITOMO METAL CORPORATION, Tokyo (JP)

(72) Inventors: Keinosuke Iguchi, Tokyo (JP); Masaaki Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 65 days.

(21) Appl. No.: 16/066,615

(22) PCT Filed: Mar. 14, 2017

(86) PCT No.: PCT/JP2017/010154
§ 371 (c)(1),
(2) Date: Jun. 27, 2018

(87) PCT Pub. No.: WO2017/169733
PCT Pub. Date: Oct. 5, 2017

(65) Prior Publication Data
US 2019/0001774 A1 Jan. 3, 2019

(30) Foreign Application Priority Data
Mar. 30, 2016 (JP) .................................. 2016-067929

(51) Int. Cl.
B60G 11/18 (2006.01)
B60G 9/04 (2006.01)
(Continued)

(52) U.S. Cl.
CPC ............... B60G 9/04 (2013.01); B21D 22/06 (2013.01); B21D 53/88 (2013.01); B60G 21/051 (2013.01);
(Continued)

(58) Field of Classification Search
CPC ....... B21D 53/90; B21D 22/025; B21D 53/88
(Continued)

(56) References Cited

U.S. PATENT DOCUMENTS 6,119,501 A * 9/2000 Hansen .................. B21D 47/01
72/370.04
6,616,157 B2 * 9/2003 Christophliemke ... B60G 7/001
267/273
(Continued)

FOREIGN PATENT DOCUMENTS

JP 59-94521 A 5/1984
JP 2001-123227 A 5/2001
(Continued)

OTHER PUBLICATIONS

International Search Report for PCT/JP2017/010154 dated Jun. 13, 2017.
(Continued)

Primary Examiner — Toan C To
(74) Attorney, Agent, or Firm — Birch, Stewart, Kolasch & Birch, LLP

(57) ABSTRACT

This torsion beam manufacturing method is a method of manufacturing a torsion beam that includes a uniformly shaped closed cross-sectional portion of which a cross section orthogonal to a longitudinal direction is a closed cross section having a substantial V-shape or a substantial U-shape at any position in the longitudinal direction, and a shape changing portion which has a connection region leading to the uniformly shaped closed cross-sectional portion and including a closed cross section having a shape different from the shape of the closed cross section of the uniformly shaped closed cross-sectional portion. The torsion beam manufacturing method includes pulling process of applying a tensile force in the longitudinal direction to at least the connection region of a torsion beam material including the uniformly shaped closed cross-sectional portion and the shape changing portion, to obtain the torsion beam.

20 Claims, 20 Drawing Sheets

(51) Int. Cl.
  *B21D 53/88* (2006.01)
  *B60G 21/055* (2006.01)
  *B21D 22/06* (2006.01)
  *B60G 21/05* (2006.01)

(52) U.S. Cl.
  CPC ........ *B60G 21/055* (2013.01); *B60G 2200/20* (2013.01); *B60G 2200/23* (2013.01); *B60G 2202/135* (2013.01); *B60G 2206/20* (2013.01); *B60G 2206/202* (2013.01); *B60G 2206/427* (2013.01); *B60G 2206/81* (2013.01)

(58) Field of Classification Search
  USPC ..... 280/124.13, 124, 137, 124.106, 124.149, 280/124.152
  See application file for complete search history.

(56) References Cited

U.S. PATENT DOCUMENTS

| | | | | |
|---|---|---|---|---|
| 7,665,752 | B2 * | 2/2010 | Lee | B60G 21/051 280/124.137 |
| 8,490,990 | B2 * | 7/2013 | Lepre | B21C 1/24 280/124.116 |
| 8,505,941 | B2 * | 8/2013 | Hashimoto | B21D 9/15 280/124.106 |
| 9,802,235 | B2 * | 10/2017 | Friesen | B21D 7/00 |
| 2006/0059974 | A1 | 3/2006 | Park | |
| 2007/0075518 | A1 * | 4/2007 | Murata | B60B 35/04 280/124.166 |
| 2009/0071220 | A1 | 3/2009 | Gillet et al. | |
| 2010/0301577 | A1 * | 12/2010 | Toepker | B60B 35/02 280/124.106 |
| 2016/0001341 | A1 | 1/2016 | Claussen et al. | |

FOREIGN PATENT DOCUMENTS

| | | |
|---|---|---|
| JP | 2006-89031 A | 4/2006 |
| JP | 2008-63656 A | 3/2008 |
| JP | 2009-509774 A | 3/2009 |
| JP | 2011-635 A | 1/2011 |
| JP | 2013-91433 A | 5/2013 |
| JP | 2014-25773 A | 2/2014 |

OTHER PUBLICATIONS

Written Opinion of the International Searching Authority for PCT/JP2017/010154 (PCT/ISA/237) dated Jun. 13, 2017.

\* cited by examiner

FIG. 21
(A)
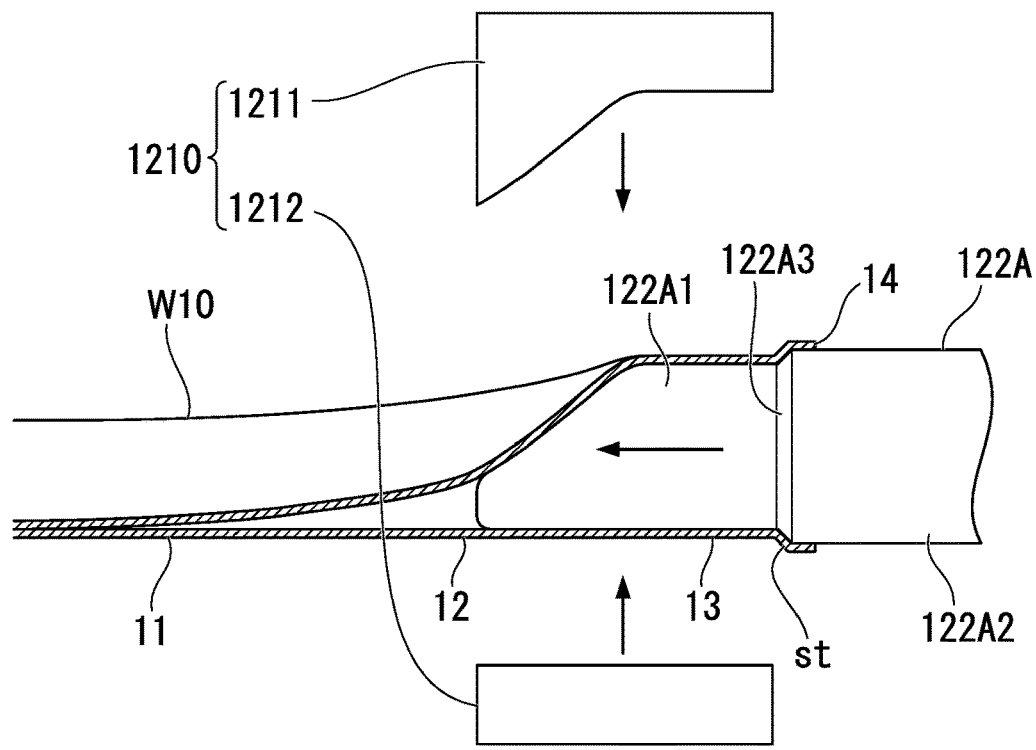
(B)
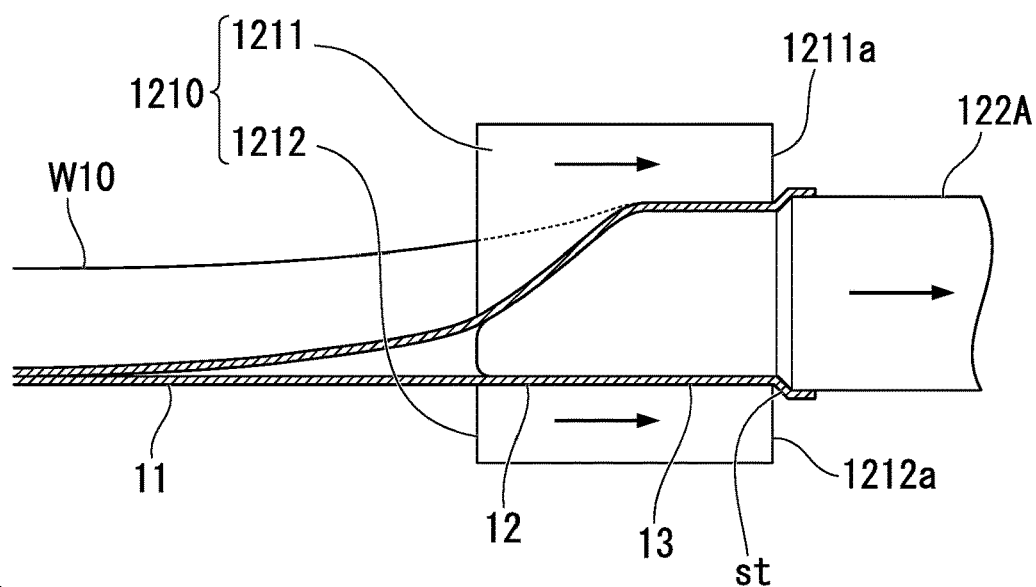

TORSION BEAM MANUFACTURING METHOD AND TORSION BEAM MANUFACTURING APPARATUS

TECHNICAL FIELD OF THE INVENTION

The present invention relates to a torsion beam manufacturing method and a torsion beam manufacturing apparatus, for manufacturing a torsion beam which is applied to a torsion beam-type suspension apparatus for automobiles and in which metal fatigue is suppressed.

Priority is claimed on Japanese Patent Application No. 2016-067929, filed on Mar. 30, 2016, the content of which is incorporated herein by reference.

RELATED ART

As is generally known, as one kind of automobile suspension systems, a torsion beam-type suspension apparatus has come into wide use.

There have been provided a torsion beam-type suspension apparatus including: a torsion beam assembly in which a pair of right and left trailing arms rotatably supporting right and left, wheels is coupled to a torsion beam and a pair of right and left spring receiving portions is joined to the vicinities of right and left ends of the torsion beam; and a spring and an absorber through which the torsion beam and a vehicle body are coupled to each other. The torsion beam is oscillatably connected to the vehicle body via pivot axes extending from the right and the left toward a central side of the vehicle body.

A torsion beam is formed by, for example, performing deformation processing of a metal pipe through press forming or hydro-form forming, and a cross section of the torsion beam orthogonal to a longitudinal direction is formed into a closed cross section having a substantial V-shape or a substantial U-shape from attachment portions with respect to trailing arms toward a uniformly shaped closed cross-sectional portion (for example, refer to Patent Document 1).

The torsion beam includes the uniformly shaped closed cross-sectional portion which has a substantially constant closed cross section having a substantial V-shape or a substantial U-shape, the attachment portions which are connected to the right and left trailing arms, and shape changing portions (gradual changing portions) which are positioned between the uniformly shaped closed cross-sectional portion and the attachment portions. In a case where a vehicle body receives an external force from a road surface, rolling rigidity of the vehicle body is ensured mainly by torsional rigidity of the torsion beam.

Meanwhile, even if the torsion beam has sufficient rolling rigidity, since the torsion beam receives various external forces from a road surface via the wheels or the trailing arms, a complicated stress distribution is generated due to such external forces, so that metal fatigue is likely to progress. The metal fatigue is very likely to be caused, for example, in the vicinity of a connection portion between the shape changing portion and the uniformly shaped closed cross-sectional portion.

Therefore, even in a case where various external forces are received from a road surface, metal fatigue needs to be suppressed from progressing, and various technologies have been developed to suppress such metal fatigue (for example, refer to Patent Documents 2, 3, and 4).

According to a technology disclosed in Patent Document 2, a press-formed torsion beam is subjected to quenching, tempering, and shot-peening, and an outer surface of the torsion beam is hardened, so that fatigue properties of the torsion beam are improved.

According to a technology disclosed in Patent Document 3, surface hardness of a torsion beam is improved by using a steel pipe of which surface hardness increases after heat treatment, so that fatigue properties of the torsion beam are improved.

According to a technology disclosed in Patent Document 4, tensile stress is applied by applying a pressure outward from the inside of a steel pipe through hydro-forming. As a result, residual stress of a torsion beam is reduced, so that fatigue properties are improved.

PRIOR ART DOCUMENT

Patent Document

[Patent Document 1] Japanese Unexamined Patent Application, First Publication No. 2011-635

[Patent Document 2] Japanese Unexamined Patent Application, First Publication No. 2001-123227

[Patent Document 3] Japanese Unexamined Patent Application, First Publication No. 2008-063656

[Patent Document 4] Japanese Unexamined Patent Application, First Publication No. 2013-091433

DISCLOSURE THE INVENTION

Problems to be Solved by the Invention

However, it is not always easy to improve fatigue properties of a torsion beam by applying the technologies disclosed in Patent Documents 2 to 4, and there is a problem of an increase in initial cost, such as plant and equipment investment, or manufacturing running cost. Therefore, there is a demand for a torsion beam manufacturing technology m which a torsion beam having excellent fatigue properties can be efficiently manufactured.

The present invention has been made in view of the foregoing circumstances, and an object thereof is to provide a torsion beam manufacturing method and a torsion beam manufacturing apparatus, capable of efficiently manufacturing a torsion beam having excellent fatigue.

Means for Solving the Problem

In order to solve the problem above, the present invention proposes the followings.

(1) According to an aspect of the present invention, there is provided a torsion beam manufacturing method for manufacturing a torsion beam including a uniformly shaped closed cross-sectional portion of which a cross section orthogonal to a longitudinal direction is a closed cross section having a substantial V-shape or a substantial U-shape at any position in the longitudinal direction, and a shape changing portion which has a connection region leading to the uniformly shaped closed cross-sectional portion and including a closed cross section having a shape different from the shape of the closed cross section of the uniformly shaped closed cross-sectional portion. The torsion beam manufacturing method includes pulling process of applying a tensile force in the longitudinal direction to at least the connection region of a torsion beam material including the uniformly shaped closed cross-sectional portion and the shape changing portion, to obtain the torsion beam.

In the torsion beam manufacturing method according to the aspect since a tensile force is applied to at least the connection region during the pulling process, remaining residual stress can be reduced or removed.

As a result, a torsion beam having excellent fatigue properties can be manufactured. Furthermore, since post-treatment such as heat treatment is not necessary, manufacturing can be efficiently performed.

(2) In the torsion beam manufacturing method according to (1) in the pulling process, the tensile force may be applied by moving an inner side support member and an outer locking member in a direction separated from the uniformly shaped closed cross-sectional portion in a state where an inner side of an outside part of the connection region in the longitudinal direction is supported by the inner side support member and the outer locking member is locked on an outer side of the outside part.

In this case, during the pulling process, since a tensile force is applied after the outside part of the torsion beam material is supported by the inner side support member and the outer locking member is locked on the outer side of the outside part, a tensile force can be easily applied while suppressing deformation of the outside part.

(3) In the torsion beam manufacturing method according to (2), in the pulling process, the outer side of the connection region may be supported by an outer support member, and the outer support member may be moved synchronously with movement of the inner side support member and the outer locking member in the same direction.

In this case, since the outer support member moves synchronously with movement of the inner side support member and the outer locking member, extension of the torsion beam material entailed in pulling is not hindered. Therefore, the tensile force can be reliably applied to the torsion beam material, and residual stress can be reliably reduced or removed.

(4) In the torsion beam manufacturing method according to (1), in the pulling process, the tensile force may be applied across an entire length of the torsion beam material by causing both ends of the torsion beam material to be relatively separated from each other along the longitudinal direction.

In this case, since the torsion beam material is pulled outward in the longitudinal direction over the entire length thereof, residual stress can be reduced or removed without omission.

(5) In the torsion beam manufacturing method according to any one of (1) to (4), in the pulling process, distortion equal to or greater than 1% in the longitudinal direction may be applied to at least the connection region of the torsion beam material in the longitudinal direction.

In this case, it is possible to apply a tensile farce sufficient for removing or reducing residual stress of the torsion beam material.

(6) The torsion beam manufacturing method according to any one of (1) to (5) may further include pressing process of obtaining the torsion beam material by pressing a raw pipe, before the pulling process.

In this case, although residual stress is remaining in the torsion beam material at after the pressing process, the residual stress can be removed in the successive pulling process.

(7) According to another aspect of the present invention, there is provided a torsion beam manufacturing apparatus for manufacturing a torsion beam including a uniformly shaped closed cross-sectional portion of which a cross section orthogonal to a longitudinal direction is a closed cross section having a substantial V-shape or a substantial U-shape at any position in the longitudinal direction, and a shape changing portion which has a connection region leading to the uniformly shaped closed cross-sectional portion and including a closed cross section having a shape different from the shape of the closed cross section of the uniformly shaped closed cross-sectional portion. The torsion beam manufacturing apparatus includes: a pair of holding mechanisms that holds one portion located more than one side of the connection region and another portion located more than another side of the connection region in a view seen along the longitudinal direction of a torsion beam material, in the torsion beam material including the uniformly shaped closed cross-sectional portion and the shape changing portion; and a first driving mechanism that causes the holding mechanisms to be relatively separated from each other.

In the torsion beam manufacturing apparatus according to the aspect, since the pair of holding mechanisms and the first driving mechanism apply a tensile force in the longitudinal direction to at least the connection region in the torsion beam material, residual stress remaining in the torsion beam material can be reduced or removed.

As a result, the torsion beam having excellent fatigue properties can be manufactured. Furthermore, since post-treatment such as heat treatment is not necessary, manufacturing can be efficiently performed.

(8) In the torsion beam, manufacturing apparatus according to (7), the holding mechanisms may respectively hold both ends of the torsion beam material.

In this case, since both ends of the torsion beam material are pulled while being held by the pair of holding mechanisms, a tensile force can be applied over the entire length of the torsion beam material. Therefore, residual stress can be reduced or removed without omission over the entire length of the torsion beam material.

(9) The torsion beam manufacturing apparatus according to (8) may further include: a movable die that has a shape corresponding to the uniformly shaped closed cross-sectional portion and the shape changing portion; and a second driving mechanism that presses the movable die with respect to a raw pipe which is before forming the uniformly shaped closed cross-sectional portion and the shape changing portion in the torsion beam material.

In this case, since the second driving mechanism presses the movable die with respect to the raw pipe, a torsion beam material having the uniformly shaped closed cross-sectional portion and the shape changing portion can be obtained.

(10) In the torsion beam manufacturing apparatus according to (7), at least one of the holding mechanisms may include an inner side support member which is inserted into an inner side of the shape changing portion, and an outer locking member which is locked on an outer side of the shape changing portion.

In this case, since a tensile force can be applied after the inner side of the shape changing portion of the torsion beam material is supported by the inner side support member and the outer locking member is locked on the outer side of the shape changing portion, a tensile force can be easily applied while suppressing deformation of the shape changing portion.

(11) The torsion beam manufacturing apparatus according to (10) may further include: a movable die that has a shape corresponding to the uniformly shaped closed cross-sectional portion and the shape changing portion; and a second driving mechanism that presses the movable die with respect to a raw pipe which is before forming the uniformly shaped closed cross-sectional portion and the shape changing portion in the torsion beam material.

In this case, the second driving mechanism presses the movable die with respect to the raw pipe, and thereby enabling obtaining the torsion beam material having the uniformly shaped closed cross-sectional portion and the shape changing portion.

(12) The torsion beam manufacturing apparatus according to (11) may employ the following configuration. The movable die is provided with a movable die main body portion which has a shape corresponding to at least the uniformly shaped closed cross-sectional portion, a movable die end portion which has a shape corresponding to at least the shape changing portion and is provided so as to be freely separated from the movable die main body portion, and a third driving mechanism which causes the movable die end portion to be separated from the movable die main body portion. The movable die end portion also serves as the outer locking member.

In this case, with respect to the raw pipe pressed by the movable die, the movable die main body portion applies the shape corresponding to at least the uniformly shaped closed cross-sectional portion and the movable die end portion applies the shape corresponding to at least the shape changing portion. In a state where the inner side support member is inserted into the inner side of the shape changing portion of the torsion beam material obtained in such a manner and the movable die end portion is locked on the outer side of the shape changing portion, a tensile force is applied to the torsion beam material. According to this configuration, since the movable die end portion also serves as the outer locking member, a tensile force can be continuously applied without transferring the torsion beam material, which has been obtained by performing press working with respect to the raw pipe, to another apparatus.

(13) In the torsion beam manufacturing apparatus according to (12), the third driving mechanism may be a cam which is inserted into a gap between the movable die main body portion and the movable die end portion.

In this case, first, the raw pipe is pressed by the movable die main body portion and the movable die end portion and is processed into the torsion beam material. Subsequently, the cam is thrust into the gap, so that the gap between the movable die main body portion and the movable die end portion is widened. Then, the movable die end portion moves in a direction separated from the movable die main body portion. Accordingly, a tensile force is applied to the torsion beam material, so that residual stress can be reduced or removed.

(14) The torsion beam manufacturing apparatus according to any one of (7) to (13) may employ the following configuration farther including a support die that supports the torsion beam material. The support die is provided with a support die main body portion which supports the torsion beam material at a part including the uniformly shaped closed cross-sectional portion, and a support die end portion which is provided so as to be freely separated from the support die main body portion and supports at least the shape changing portion.

In this case, when a tensile force is applied to the torsion beam material, since the support die end portion is freely separated from the support die main body portion, extension of the torsion beam material entailed in pulling is not hindered. Therefore, a tensile force can be reliably applied to the torsion beam material, and residual stress can be reliably reduced or removed.

(15) The torsion beam manufacturing apparatus according to any one of (7) to (14) may employ the following configuration further including a control unit that controls the first driving mechanism. The control unit operates the first driving mechanism and applies distortion equal to or greater than 1% to at least the connection region of the torsion beam material in the longitudinal direction.

In this case, it is possible to apply a tensile force sufficient for removing or reducing residual stress of the torsion beam material.

In addition to the aspects described above, the present invention may employ the following aspects.

(a) As an alternative aspect of the present invention, there is provided a torsion beam manufacturing method of manufacturing a torsion beam being used in a torsion beam-type suspension apparatus and having a both end portions in a longitudinal direction coupled with a pair of right and left arms. The torsion beam includes: a uniformly shaped closed cross-sectional portion of which a cross section orthogonal to the longitudinal direction has a substantially constant closed cross-sectional shape of a substantial V-shape or a substantial U-shape in which a part between a front end and a rear end in a forward/rearward direction of a vehicle body protrudes upward or downward; an attachment closed cross-sectional portion; and a shape changing portion which is positioned between the uniformly shaped closed cross-sectional portion and the attachment closed cross-sectional portion. The torsion beam manufacturing method includes: press working process for forming a torsion beam material which is obtained by pressing a metal material pipe and has the uniformly shaped closed cross-sectional portion and the shape changing portion; and pulling treating process for pulling at least a connection portion connecting the uniformly shaped closed cross-sectional portion and the shape changing portion to each other in the torsion beam material in the longitudinal direction.

In the torsion beam manufacturing method according to the aspect, the torsion beam manufacturing method includes: the press working process for forming a torsion beam material which is obtained by pressing a metal material pipe and has the uniformly shaped closed cross-sectional portion and the shape changing portion; and the pulling treating process for palling at least the connection portion connecting the uniformly shaped closed cross-sectional portion and the shape changing portion to each other in the torsion beam material in die longitudinal direction. Therefore, tensile residual stress can be reduced or removed from the connection portion.

As a result, a torsion beam having excellent fatigue properties can be efficiently manufactured.

In this specification, the uniformly shaped closed cross-sectional portion denotes a part in which a substantially constant closed cross-sectional shape of a substantial V-shape or a substantial U-shape (for example, a valley portion (bottom portion) of a wall portion constituting a recessed side having the substantial V-shape or the substantial U-shape) is continuously formed along the longitudinal direction. Moreover, even in a case where unevenness is partially formed in a region to the shape changing portion, in which the valley portion (bottom portion) of the wall portion constituting the recessed side having the substantial V-shape or the substantial U-shape continues and becomes gradually shallow, the region is included in the uniformly shaped closed cross-sectional portion.

In addition, in this specification, the shape changing portion denotes a part having a form which is continuously formed and in which the valley portion (bottom portion) of the wall portion constituting the recessed side having the substantial V-shape or the substantial U-shape becomes gradually shallow. A part in which the valley portion (bottom portion) partially becomes shallow may be formed in the middle of the shape changing portion.

In addition, in this specification, the attachment closed cross-sectional portion denotes a part which is positioned outward in the longitudinal direction of the shape changing portion (outward in a vehicle width direction) and in which a recessed part having a substantial V-shape or a substantial U-shape is not formed.

In addition, in this specification, the connection portion connecting the uniformly shaped closed cross-sectional portion and the shape changing portion to each other denotes a part including a boundary between the uniformly shaped closed cross-sectional portion and the shape changing portion, that is, a part including a portion in which the valley portion (bottom portion) of the wall portion constituting the recessed side having the substantial V-shape or the substantial U-shape formed along the longitudinal direction in the uniformly shaped closed cross-sectional portion continues in the shape changing portion, becomes gradually shallow, and is transformed into a form inclined with respect to the longitudinal direction. Moreover, the connection portion can be set in any manner based on a distribution of tensile residual stress, or the like.

(b) In the torsion beam manufacturing method according to (a), in the pulling treating process, the connection portion is pulled in the longitudinal direction by inserting an inside support member into the shape changing portion of the torsion beam material and locking a shape changing portion support member in the shape changing portion.

According to the torsion beam manufacturing method, in the pulling treating process, the connection portion is pulled in the longitudinal direction by inserting the inside support member into the shape changing portion of the torsion beam material and locking the shape changing portion support member in the shape changing portion. Therefore, the connection portion of the torsion beam material can be easily pulled outward in the longitudinal direction and distortion of the shape changing portion can be reliably prevented.

As a result, a torsion beam having excellent fatigue properties can be efficiently manufactured.

(c) In the torsion beam manufacturing method according to (a), in the pulling treating process, the connection portion is pulled in the longitudinal direction by holding the attachment closed cross-sectional portion of the torsion beam material.

According to the torsion beam manufacturing method, in the pulling treating process, since the connection portion is pulled in the longitudinal direction by holding the attachment closed cross-sectional portion of the torsion beam material, the torsion beam material can be pulled outward in the longitudinal direction over the entire length.

As a result, a torsion beam having excellent fatigue properties can be efficiently manufactured.

(d) As another alternative aspect of the present invention, there is provided a torsion beam manufacturing apparatus for manufacturing a torsion beam being used in a torsion beam-type suspension apparatus and having a both end portions in a longitudinal direction coupled with a pair of right and left arms. The torsion beam includes: a uniformly shaped closed cross-sectional portion of which a cross section orthogonal to the longitudinal direction has a substantially constant closed cross-sectional shape of a substantial V-shape or a substantial U-shape in which a part between a front end and a rear end in a forward/rearward direction of a vehicle body protrudes upward or downward; an attachment closed cross-sectional portion; and a shape changing portion which is positioned between the uniformly shaped closed cross-sectional portion and the attachment closed cross-sectional portion. The torsion beam manufacturing apparatus includes: a shape changing portion outside holding member that has an exterior shape holding shape portion formed complementarity to the shape changing portion; a shape changing portion support member that is provided in the forming die, locks the shape changing portion from an inner side in the longitudinal direction, and supports the shape changing portion; a driving unit that moves an attachment closed cross-sectional portion holding member forward and rearward in the longitudinal direction of a torsion beam material; and a control unit. The control unit is configured to move the shape changing portion support member outward in the longitudinal direction of the torsion beam material in a state where the shape changing portion is held by the shape changing portion outside holding member and the inside support member after the torsion beam material is formed.

According to the torsion beam apparatus, the connection portion is pulled in the longitudinal direction by moving the shape changing portion support member outward in the longitudinal direction of the torsion beam material in a state where the shape changing portion is held by the shape changing portion outside holding member which has the exterior shape holding shape portion formed complementarity to the shape changing portion, and the shape changing portion support member which is provided in the forming die, locks the shape changing portion from the inner side in the longitudinal direction, and supports the shape changing portion. Therefore, distortion of the shape changing portion can be prevented and pulling treatment can be stably performed.

As a result a torsion beam having excellent fatigue properties can be efficiently manufactured.

(e) As further another alternative aspect of the present invention, there is provided a torsion beam manufacturing apparatus for manufacturing a torsion beam being used in a torsion beam-type suspension apparatus and having a both end portions in a longitudinal direction coupled with a pair of right and left arms. The torsion beam includes: a uniformly shaped closed cross-sectional portion of which a cross section orthogonal to the longitudinal direction has a substantially constant closed cross-sectional shape of a substantial V-shape or a substantial U-shape in which a part between a front end and a rear end in a forward/rearward direction of a vehicle body protrudes upward or downward; an attachment closed cross-sectional portion; and a shape changing portion which is positioned between the uniformly shaped closed cross-sectional portion, and the attachment closed cross-sectional portion. The torsion beam manufacturing apparatus includes: an attachment closed cross-sectional portion holding member that holds the attachment closed cross-sectional portion; a driving unit that moves the attachment closed cross-sectional portion holding member forward and rearward in the longitudinal direction of a torsion beam material; and a control unit. The control unit is configured to pull the torsion beam material in the longitudinal direction in a state where the attachment closed cross-sectional portion holding member holds the attachment closed cross-sectional portion.

According to the torsion beam apparatus, since the connection portion is pulled in the longitudinal direction by holding the attachment closed cross-sectional portion of the torsion beam material, the torsion beam material can be pulled outward in the longitudinal direction over the entire length.

As a result, a torsion beam having excellent fatigue properties can be efficiently manufactured.

(f) As still another alternative aspect of the present invention, there is provided a torsion beam manufacturing apparatus for manufacturing a torsion beam being used in a torsion beam-type suspension apparatus and having a both end portions in a longitudinal direction coupled with a pair of right and left arms. The torsion beam includes: a uniformly shaped closed cross-sectional portion of which a cross section orthogonal to the longitudinal direction has a substantially constant closed cross-sectional shape of a substantial V-shape or a substantial U-shape in which a part between a front end and a rear end in a forward/rearward direction of a vehicle body protrudes upward or downward; an attachment closed cross-sectional portion; and a shape changing portion which is positioned between the uniformly shaped closed cross-sectional portion and the attachment closed cross-sectional portion. The torsion beam manufacturing apparatus includes: a forming die that presses a metal material pipe to form a torsion beam material having the uniformly shaped closed cross-sectional portion and the shape changing portion; a shape changing portion support member that is provided in the forming die, locks the shape changing portion from an inner side in the longitudinal direction, and supports the shape changing portion; a shape changing portion support member driving unit that is provided in the forming die and moves the shape changing portion support member forward and rearward in the longitudinal direction; an inside support member that is able to be inserted into the shape changing portion and holds the shape changing portion in cooperation with the shape changing portion support member; and a control unit. The control unit is configured to move the shape changing portion support member outward in the longitudinal direction of the torsion beam material in a state where the shape changing portion is held by the shape changing portion support member and the inside support member after the torsion beam material is formed.

According to the torsion beam manufacturing apparatus, the control unit causes the driving unit to pull the torsion beam material outward in the longitudinal direction in a state where the shape changing portion support member and the inside support member hold the shape changing portion in cooperation with each other after the metal material pipe is pressed and the torsion beam material is formed. Therefore, tensile residual stress can be reduced or removed from a connection portion.

As a result, a torsion beam having excellent fatigue properties can be efficiently manufactured.

(g) There is provided a torsion beam manufacturing apparatus for manufacturing a torsion beam being used in a torsion beam-type suspension apparatus and having a both end portions in a longitudinal direction coupled with a pair of right and left arms. The torsion beam includes: a uniformly shaped closed cross-sectional portion of which a cross section orthogonal to the longitudinal direction has a substantially constant closed cross-sectional shape of a substantial V-shape or a substantial U-shape in which a part between a front end and a rear end in a forward/rearward direction of a vehicle body protrudes upward or downward; an attachment closed cross-sectional portion; and a shape changing portion which is positioned between the uniformly shaped closed cross-sectional portion and the attachment closed cross-sectional portion. The torsion beam manufacturing apparatus includes: a forming die that presses a metal material pipe to form a torsion beam material having the uniformly shaped closed cross-sectional portion and the shape changing portion; a shape changing portion support member that is provided in the forming die, locks the shape changing portion from an inner side in the longitudinal direction, and supports the shape changing portion; a shape changing portion support member driving unit that is provided in the forming die and moves the shape changing portion support member forward and rearward in the longitudinal direction; and an inside support member that is able to be inserted into the shape changing portion and holds the shape changing portion in cooperation with the shape changing portion support member. The driving unit is constituted of a cam mechanism which operates in accordance with strokes when the forming die forms the torsion beam material.

According to the torsion beam manufacturing apparatus, after the metal material pipe is pressed and the torsion beam material is formed, tensile residual stress can be reduced or removed from a connection portion since the cam mechanism operates in accordance with strokes while forming the torsion beam material and the driving unit pulls the torsion beam material outward in the longitudinal direction in a state where the shape changing portion support member and the inside support member hold the shape changing portion in cooperation with each other.

As a result, a torsion beam having excellent fatigue properties can be efficiently manufactured.

(h) The torsion beam manufacturing apparatus according to any one of (d) to (g) further includes a shape change absorption unit that is changed in shape in the longitudinal direction and is displaced when the torsion beam material is pulled in the longitudinal direction.

According to the torsion beam manufacturing apparatus, since the torsion beam manufacturing apparatus includes die shape change absorption unit that is changed in shape in the longitudinal direction and is displaced when the torsion beam material is pulled in the longitudinal direction, even in a case where a torsion beam has a shape with a large central side in the longitudinal direction, pulling treatment can be easily performed.

In addition, it is possible to prevent damage to the torsion beam material when performing pulling treatment process and to efficiently reduce residual stress.

Effects of the Invention

According to the torsion beam manufacturing method and the torsion beam manufacturing apparatus in the aspects described above, a torsion beam having excellent fatigue properties can be efficiently manufactured.

BRIEF DESCRIPTION OF THE DRAWINGS

FIG. 9(A) illustrates a stress distribution before pulling treatment, and FIG. 9(B) illustrates a stress distribution after pulling treatment.

FIG. 10(A) illustrates a stress distribution before pulling treatment, and FIG. 10(B) illustrates a stress distribution alter pulling treatment.

FIG. 11(A) illustrates a stress distribution before pulling treatment, and FIG. 11(B) illustrates a stress distribution after pulling treatment.

FIG. 21 is a view illustrating a case where a modification example of the present invention is applied to the second embodiment, and the diagram illustrates a part corresponding to G-section in FIG. 12. FIG. 21(A) illustrates a step for forming a stepped portion in a pipe end and gripping the pipe end, and FIG. 21(B) illustrates a step for polling the pipe end after being gripped.

EMBODIMENTS OF THE INVENTION

<First Embodiment>

Hereinafter, with reference to FIGS. 1 to 11(B), a first embodiment of the present invention will be described.

Figure 1:
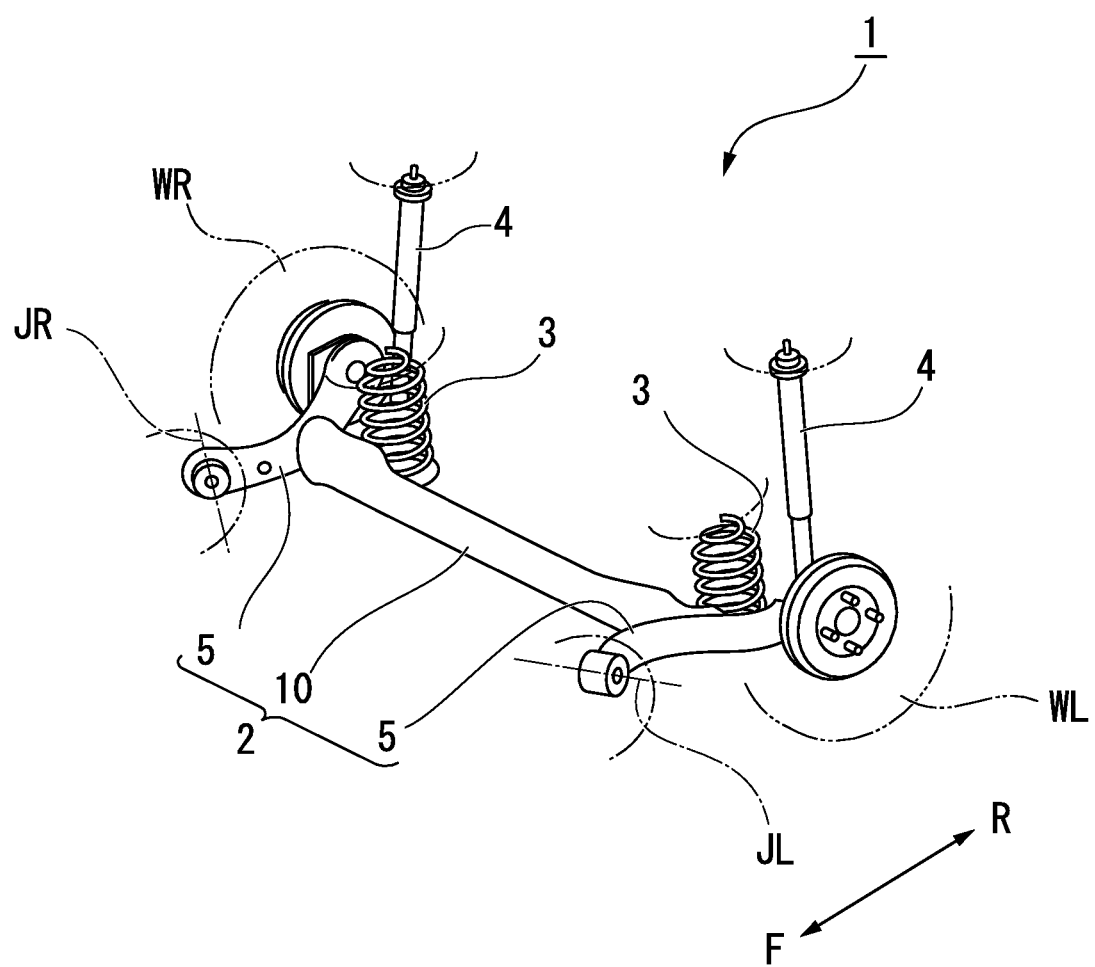
FIG. 1 is a perspective view describing a schematic configuration of a torsion beam-type rear suspension apparatus according to a first embodiment of the present invention.

FIG. 1 is a view illustrating a schematic configuration of a torsion beam-type rear suspension apparatus (torsion beam-type suspension apparatus) according to the present embodiment. The reference sign 1 indicates a torsion beam-type rear suspension apparatus. The reference sign 2 indicates a torsion beam assembly. The reference sign 10 indicates a torsion beam. The reference sign F illustrated in FIG. 1 indicates the front of a vehicle (not illustrated) in which the torsion beam-type rear suspension apparatus 1 is mounted, and the reference sign R indicates the rear.

As illustrated in FIG. 1, the torsion beam-type rear suspension apparatus 1 includes the torsion beam assembly 2, and springs 5 and absorbers 4 through which die torsion beam assembly 2 and a vehicle body (not illustrated) are coupled to each other.

The torsion beam assembly 2 supports right and left wheels WL and WR using a pair of right and left trailing arms 5 and is coupled to the vehicle body via pivot axes JL and JE extending respectively from the right and the left of the vehicle body slightly forward toward the central side. Then, the torsion beam assembly 2 is configured to be oscillatable with respect to the vehicle body.

Figure 2:
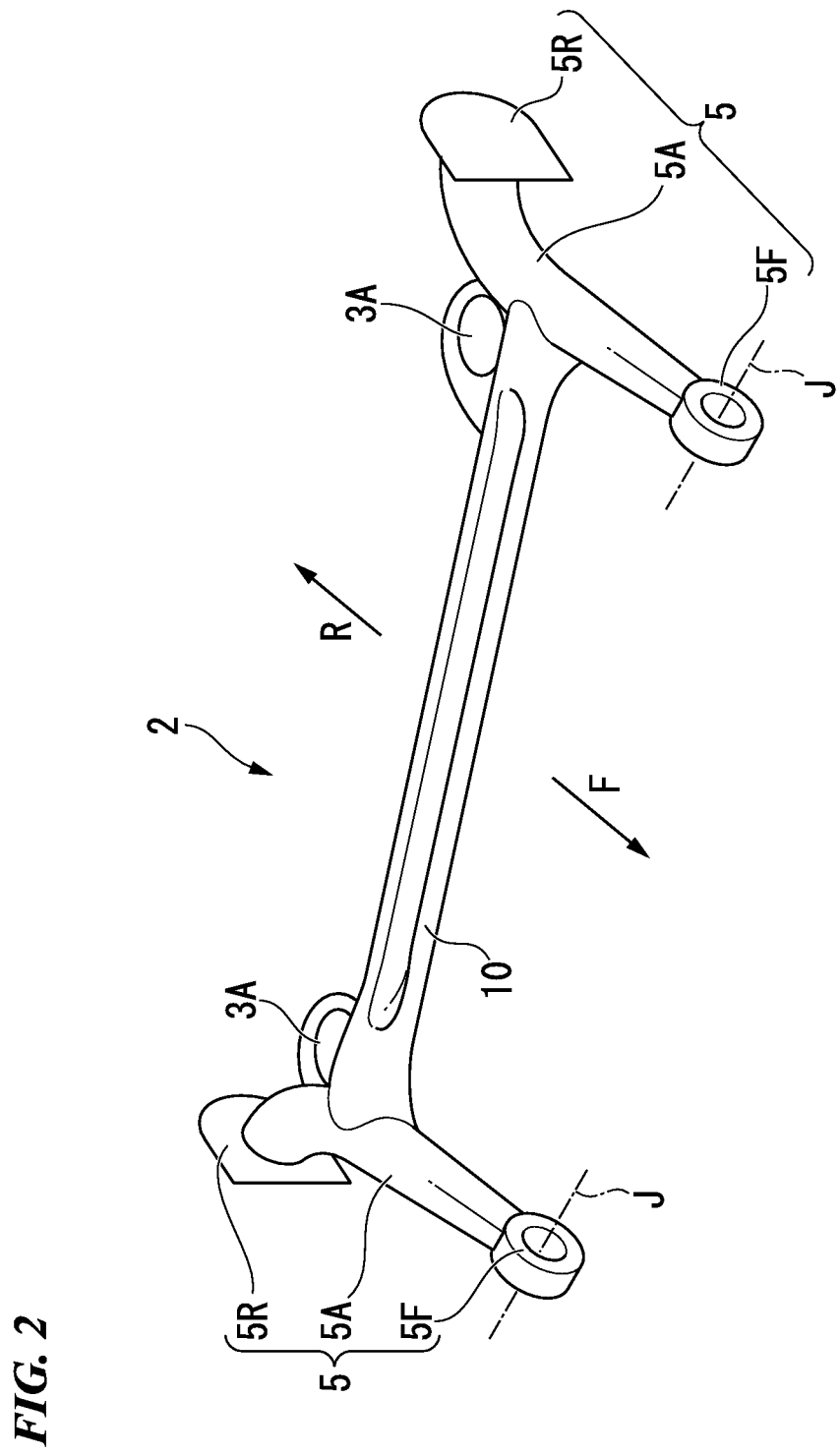
FIG. 2 is a view describing a schematic configuration of a torsion beam assembly according to the same embodiment and is a perspective view seen from below.

As illustrated in FIG. 2, for example, the torsion beam assembly 2 includes the pair of right and left trailing arms (arms) 5, the torsion beam 10 through which the trailing arms 5 are coupled to each other, and a pair of right and left spring receiving portions 3A which respectively support the springs 3. In addition, one end side of the absorbers 4 (cushioning device) is connected to a cushioning reception portion (not illustrated).

In the present embodiment, as illustrated in FIGS. 1 and 2, the torsion beam 10 has a closed cross-sectional shape of a substantial V-shape projected upward.

As illustrated in FIG. 2, for example, the trailing arms 5 include trailing arm main bodies 5A, pivot attachment members 5F which are respectively connected to front ends of the trailing arm main bodies 5A and are supported by the vehicle body via pivot axes J, and wheel attachment members 5R which are respectively coupled to rear ends of the trailing arm main bodies 5A and support the wheels WL and WR.

The spring receiving portions 3A are disposed on the opposite side of the pivot attachment members 5F interposing the torsion beam 10 therebetween. One end sides of the springs 3 are attached to the spring receiving portion 3A. A load received from a road surface is transmitted to the vehicle via the wheels WL and WR, the trailing arms 5, and the springs 3.

Hereinafter, with reference to FIGS. 3 to 5C, the torsion beam 10 according to the present embodiment will be described.

Figure 3:
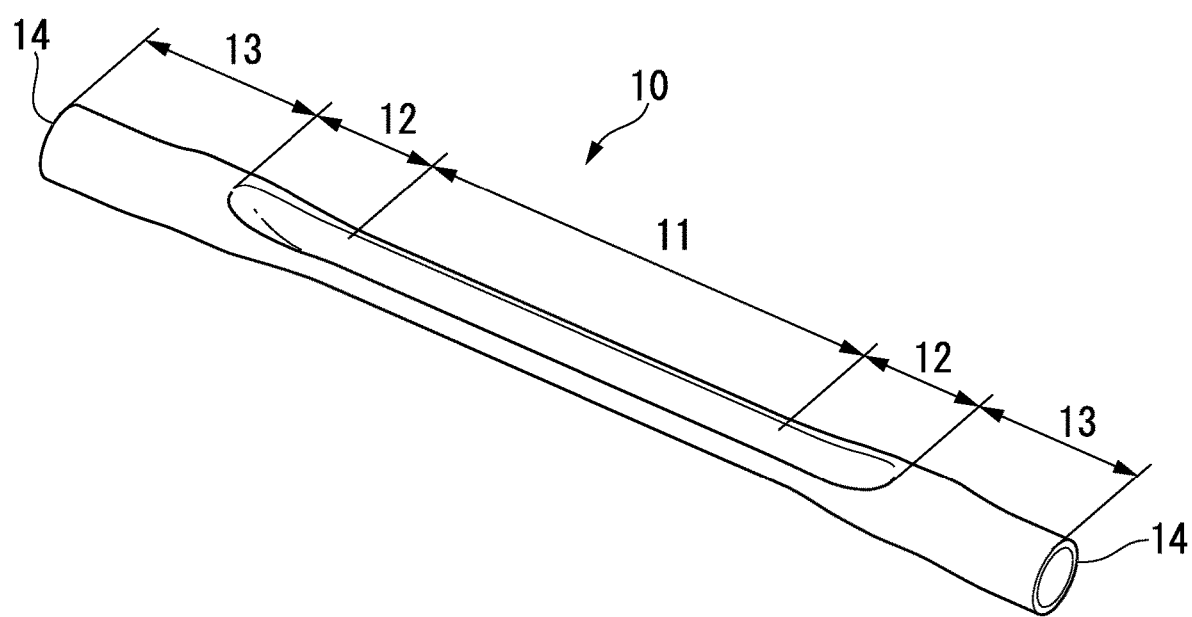
FIG. 3 is a perspective view describing a schematic configuration of a torsion beam according to the same embodiment.
Figure 4:
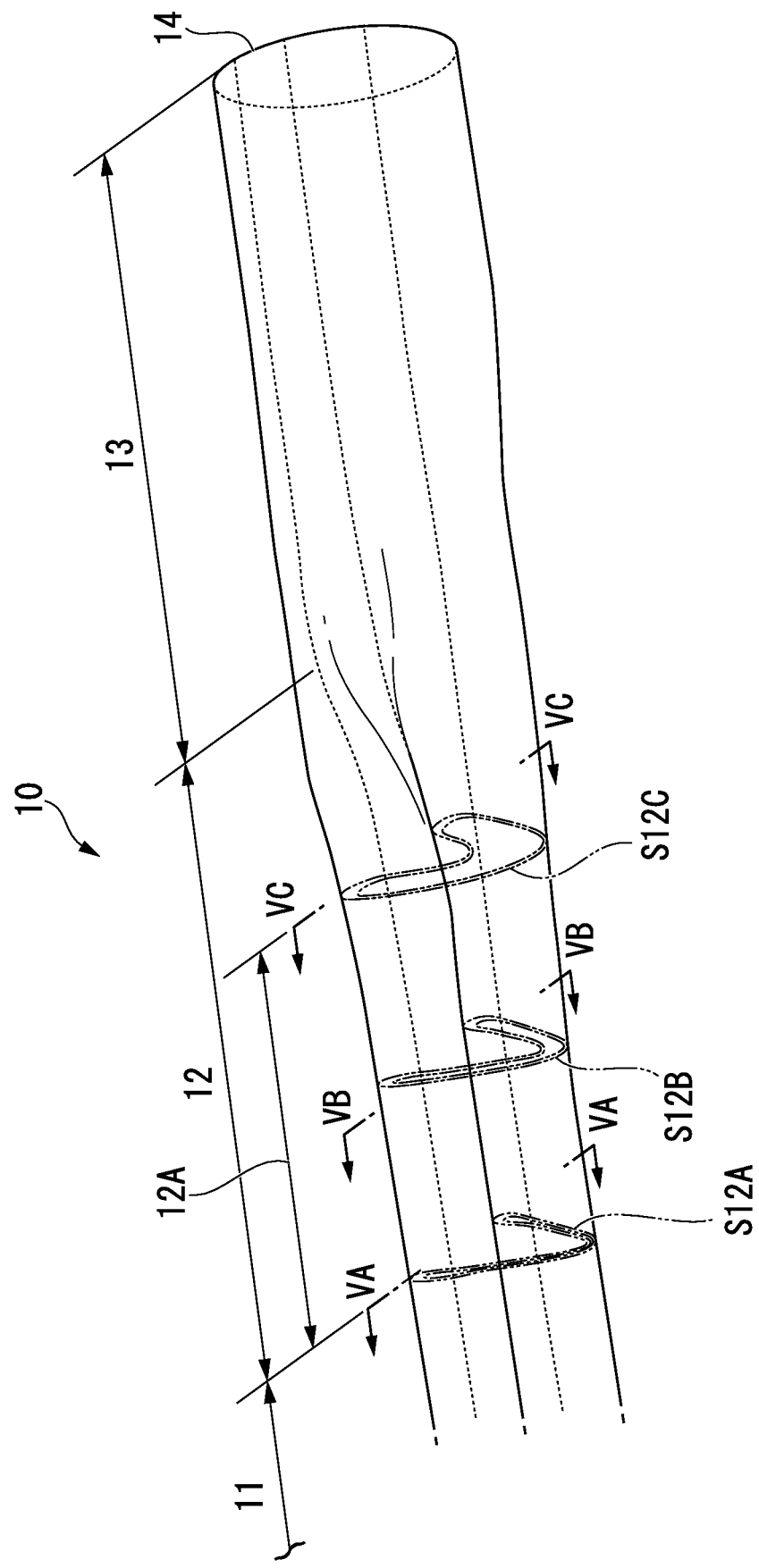
FIG. 4 is a perspective view describing a schematic configuration of a shape changing portion of the torsion beam according to the same embodiment.
Figure 5A:
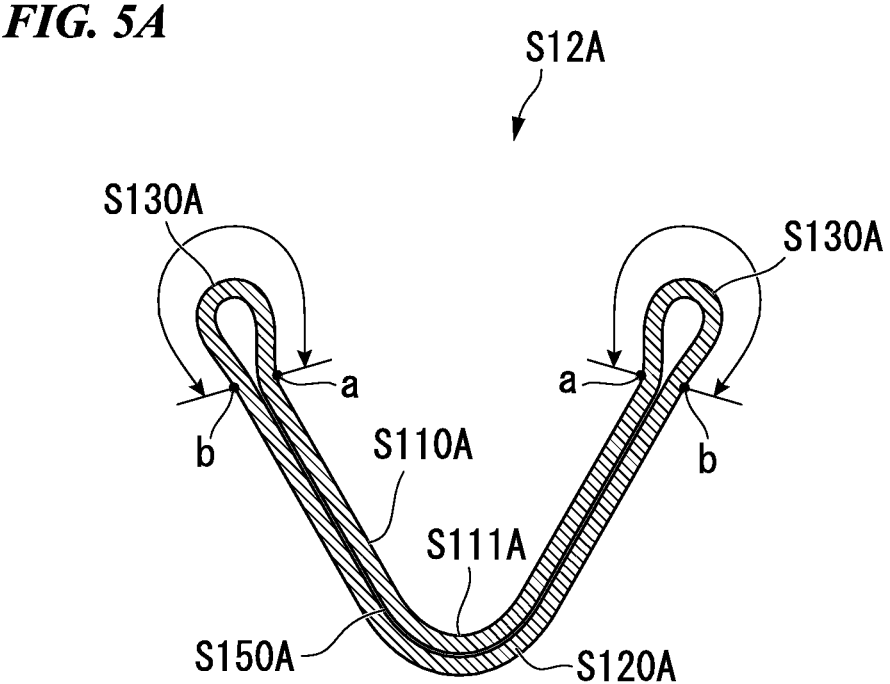
FIG. 5A is a view illustrating a schematic configuration of the torsion beam according to the same embodiment and is a closed cross-sectional view seen along arrow VA-VA in FIG. 4.
Figure 5B:
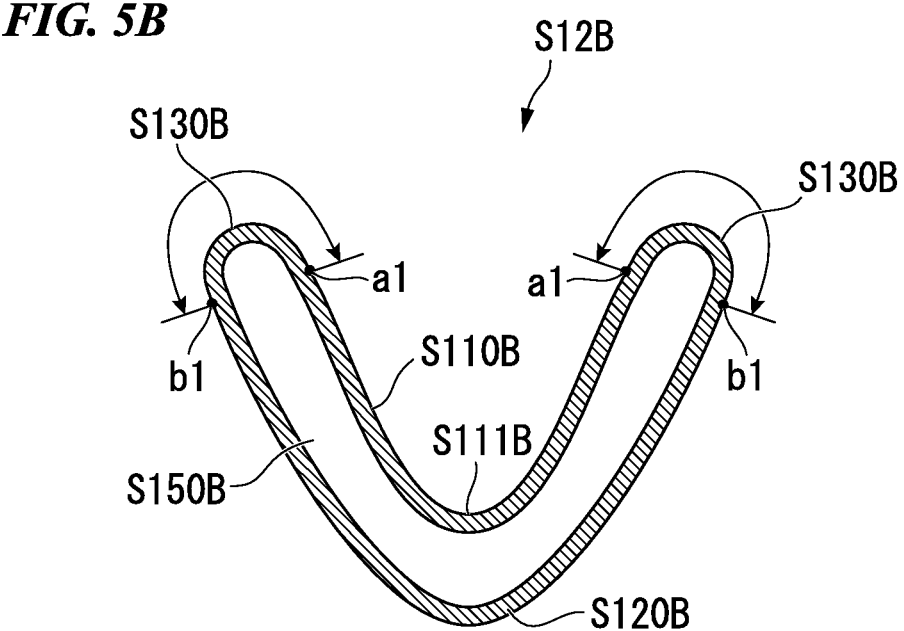
FIG. 5B is a view illustrating a schematic configuration of the torsion beam according to the same embodiment and is a closed cross-sectional view seen along arrow VB-VB in FIG. 4.
Figure 5C:
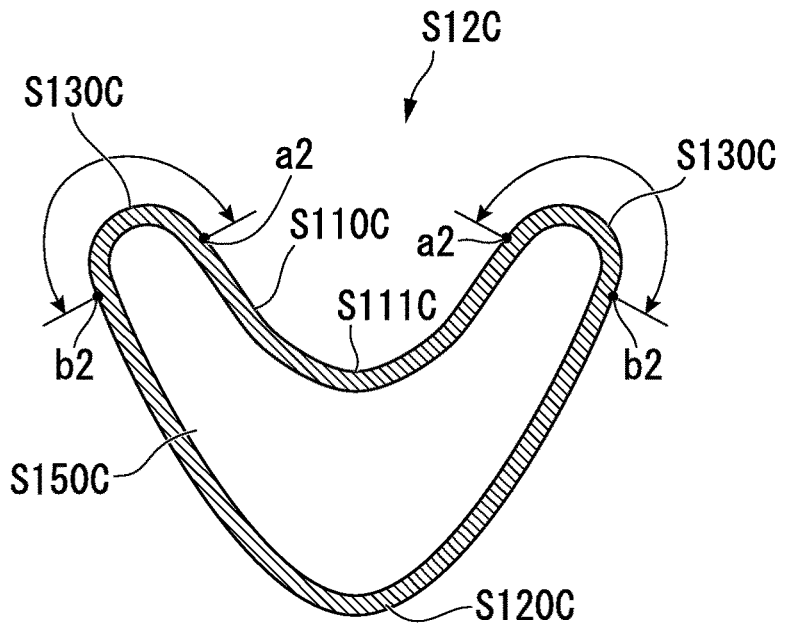
FIG. 5C is a view illustrating a schematic configuration of the torsion beam according to the same embodiment and is a closed cross-sectional view seen along arrow VC-VC in FIG. 4.

FIG. 3 is a perspective view describing a schematic configuration of the torsion beam 10 according to the present embodiment. FIG. 4 is a perspective view describing an overview in the vicinity of a shape changing portion of the torsion beam 10. FIGS. 5A, 5B, and 5C are cross-sectional views illustrating the torsion beam 10. FIG. 5A illustrates a cross-sectional view along arrow VA-VA in FIG. 4. FIG. 5B illustrates a cross-sectional view along arrow VB-VB in FIG. 4. FIG. 5C illustrates a cross-sectional view along arrow VC-VC in FIG. 4.

As illustrated in FIGS. 3 and 4, the torsion beam 10 includes a uniformly shaped closed cross-sectional portion 11 which is formed on a central side in a longitudinal direction and has a closed cross section having a substantially constant V-shape, shape changing portions 12, attachment closed cross-sectional portions 13, and attachment portions 14 which are formed in outer end portions of the attachment closed cross-sectional portions 13, which have a closed cross-sectional shape of a substantially elliptic shape, and to which the trailing arms 5 are attached.

The uniformly shaped closed cross-sectional portion 11 is a part in which a substantially constant closed cross-sectional shape of a substantial V-shape or a substantial U-shape is continuously formed along the longitudinal direction, in a case where the torsion beam 10 is seen in a cross section perpendicular to the longitudinal direction. In the uniformly shaped closed cross-sectional portion 11, unevenness may be partially formed in a valley portion (bottom portion) of a wall portion constituting a recessed side having a substantial V-shape or a substantial U-shape.

The shape changing portion 12 is a part in which the depth of the valley portion (bottom portion) of the wall portion constituting the recessed side having a substantial V-shape or a substantial U-shape becomes gradually shallow outward in the longitudinal direction (outward in a vehicle width direction). A location in which the valley portion (bottom portion) becomes further shallow may be partially formed in the middle of the shape changing portion 12.

The attachment closed cross-sectional portion 13 denotes a part which is disposed outward in the longitudinal direction of the shape changing portion 12 (outward in the vehicle width direction) and in which a recessed part having a substantial V-shape or a substantial U-shape is not formed.

The uniformly-shaped closed cross-sectional portion 11, the shape changing portions 12, the attachment closed cross-sectional portions 13, and the attachment portions 14 are disposed in this order from the center in the longitudinal direction toward both ends of the torsion beam 10. Then, the uniformly shaped closed cross-sectional portion 11 and the shape changing portion 12 are connected to each other through a connection portion 12A as illustrated in FIG. 4.

As illustrated in FIGS. 3 and 4, the uniformly shaped closed cross-sectional portion 11 is positioned at the center of the torsion beam 10 in the longitudinal direction and is connected to the shape changing portions 12 at both ends in the longitudinal direction.

In the uniformly shaped closed cross-sectional portion 11, a cross section orthogonal to the longitudinal direction of the torsion beam 10 is formed into a substantially constant V-shape. In this embodiment, for example, the uniformly shaped closed cross-sectional portion 11 has a symmetric shape in a forward/rearward direction of the vehicle body.

For example, in the closed cross section having a substantial V-shape illustrated in FIG. 5A, a cross section of the uniformly shaped closed cross-sectional portion 11 includes a first wall portion S110A which forms a recessed side inner surface, a second wall portion S120A which forms a projected side outer surface, and two folded wall portions S130A which connect both ends of the first wall portion S110A and the second wall portion S120A to each other and swell outward in the closed cross section. A center portion of the first wall portion S110A in a circumferential direction is a valley portion (bottom portion) S111A the recessed side having a substantial V-shape in the uniformly shaped closed cross-sectional portion 11.

Then, the first wall portion S110A and the second wall portion S120A are in contact with each other via a close-contact portion S150A.

The range of each of the folded wall portions S130A is indicated with the arrow in FIG. 5A, and each thereof is formed between a first wall portion side folded point a and a second wall portion side folded point b.

The first wall portion side folded point a is a connection point between an end edge of the first wall portion S110A and an end edge of the folded wall portion S130A. In addition, the second wall portion side folded point b is a connection point between an end edge of the second wall portion S120A and an end edge of the folded wall portion S130A.

The connection portion 12A (connection region) illustrated in FIG. 4 is a part which connects the uniformly shaped closed cross-sectional portion 11 and the shape changing portion 12 to each other and includes a boundary between the uniformly shaped closed cross-sectional portion 11 and the shape changing portion 12. That is, as illustrated in FIG. 4, the connection portion 12A is a part from a cross section S12A which is the boundary between the uniformly shaped closed cross-sectional portion 11 and the shape changing portion 12 to a middle position of the shape changing portion 12 in the longitudinal direction (for example, the position of a cross section S12C at which the valley portion (bottom portion) of the wall portion constituting the recessed side having a substantial V-shape or a substantial U-shape becomes gradually shallow and is transformed into a form inclined with respect to the longitudinal direction in the shape changing portion 12). The connection portion 12A can be set in any manner based on a distribution of tensile residual stress, or the like.

For example, as illustrated in FIG. 5B, a cross section S12B included in the connection portion 12A includes a first wall portion S110B which forms a recessed side inner surface in the closed cross section having a substantial V-shape, a second wall portion S120B which forms a projected side outer surface in the closed cross section, and two folded wall portions S130B which connect both ends of the first wall portion S110B and the second wall portion S120B to each other and swell outward in the closed cross section. In addition, the center portion of the first wall portion S110B in the circumferential direction is a valley portion (bottom portion) S111B on the recessed side having a substantial V-shape in the connection portion 12A.

Then, a hollow portion 150B is formed between the first wall portion S110B and the second wall portion S120B.

The range of each of the folded wall portions S130B is indicated with the arrow in FIG. 5B, and each thereof is formed between a first wall portion side folded point a1 and a second wall portion side folded point b1.

The first wall portion side folded point a1 is a connection point between an end edge of the first wall portion S110B and an end edge of the folded wall portion S130B. In addition, the second wall portion side folded point b1 is a connection point between an end edge of the second wall portion S120B and an end edge of the folded wall portion S130B.

As illustrated in FIG. 4, in the shape changing portion 12, a center-sided part in the longitudinal direction of the torsion beam 10 is connected to the uniformly shaped closed cross-sectional portion 11 and an outer side in the longitudinal direction is connected to the attachment closed cross-sectional portion 13.

In addition, in the shape changing portion 12, the shape of the closed cross section orthogonal to the longitudinal direction of the torsion beam 10 is gradually transformed from the uniformly shaped closed cross-sectional portion 11 into the attachment closed cross-sectional portion 13.

For example, as illustrated in FIG. 5C, the shape changing portion 12 includes a first wall portion S110C which forms a recessed side inner surface in the closed cross section having a substantial V-shape, a second wall portion S120C which forms a projected side outer surface in the closed cross section, and two folded wall portions S130C which connect both ends of the first wall portion S110C and the second wall portion S120C in each other and swell outward in the closed cross section. In addition, a center portion of the first wall portion S110C in the circumferential direction is a valley portion (bottom portion) S111C on the recessed side having a substantial V-shape.

Then, a hollow portion 150C is formed between the first wall portion S110C and the second wall portion S120C.

The range of each of the folded wall portions S130C is indicated with the arrow in FIG. 5C, and each thereof is formed between a first wall portion side folded point a2 and a second wall portion side folded point b2.

The first wall portion side folded point a2 is a connection point between an end edge of the first wall portion S110C and an end edge of the folded wall portion S130C. In addition, the second wall portion side folded point b2 is a connection point between an end edge of the second wall portion S120C and an end edge of the folded wall portion S130C.

As illustrated in FIG. 4, for example, the attachment closed cross-sectional portion 13 is positioned outward in the longitudinal direction of the shape changing portion 12 (outward in the vehicle width direction) and has a substantially elliptic-shaped closed cross section in which a recessed part having a substantial V-shape or a substantial U-shape is not formed.

Figure 6:
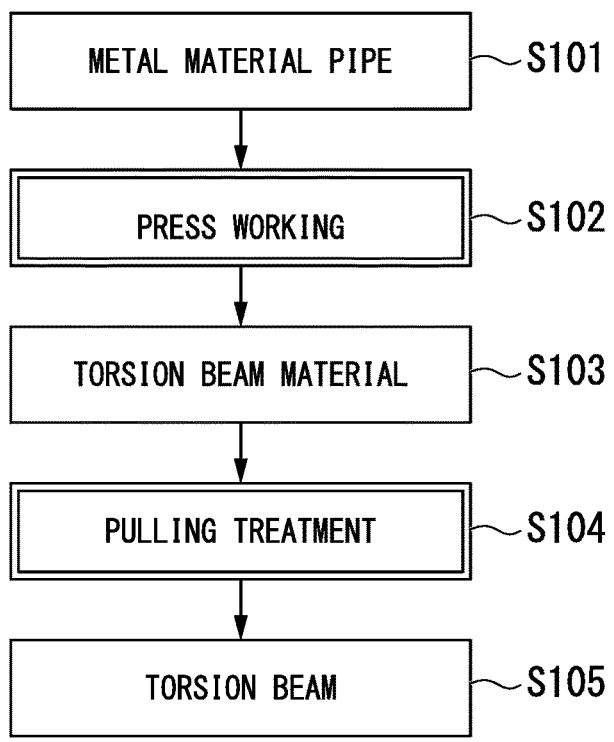
FIG. 6 is a flowchart describing an example of a manufacturing process for a torsion beam according to the same embodiment.

Next, with reference to FIG. 6, an example of a step for manufacturing the torsion beam 10 according to the first embodiment will be described. FIG. 6 is a flowchart illustrating an example of the step for manufacturing the torsion beam 10.

Hereinafter, with reference to FIG. 6, the step for manufacturing the torsion beam 10 will be described.

(1) A metal material pipe is prepared (Step S101).

As the metal material pipe to be prepared, for example, it is possible to use a circular steel pipe having a uniform thickness.

(2) Next, in a press working step, the metal material pipe is subjected to press working (Step S102).

A torsion beam material is formed through, press working of the metal material pipe. Press working can be performed by using a known press machine.

(3) The torsion beam material is formed through press working in Step S102 (Step S103). The torsion beam material has a uniformly shaped closed cross-sectional portion, shape changing portions, and attachment closed cross-sectional portions. Connection portions (connection regions) connecting the uniformly shaped closed cross-sectional portion and the shape changing portions to each other are formed.

(4) Subsequently, in a pulling treatment step, the torsion beam material is subjected to pulling treatment (Step S104). In this pulling treatment, distortion equal to or greater than 1% is applied to the torsion beam material in its axial direction, so that residual stress on outer and inner surfaces in a sheet thickness direction can be reliably released. A tensile force may be applied to only a particular portion in the longitudinal direction of the torsion beam material, in which residual stress is intended to be reduced. However, as in the present embodiment, it is preferable that a tensile force is applied over the entire length in regard to a point that residual stress can be generally reduced without omission.

(5) In Step S104, the torsion beam 10 is formed through pulling treatment of the torsion beam material (Step S105).

Figure 7:
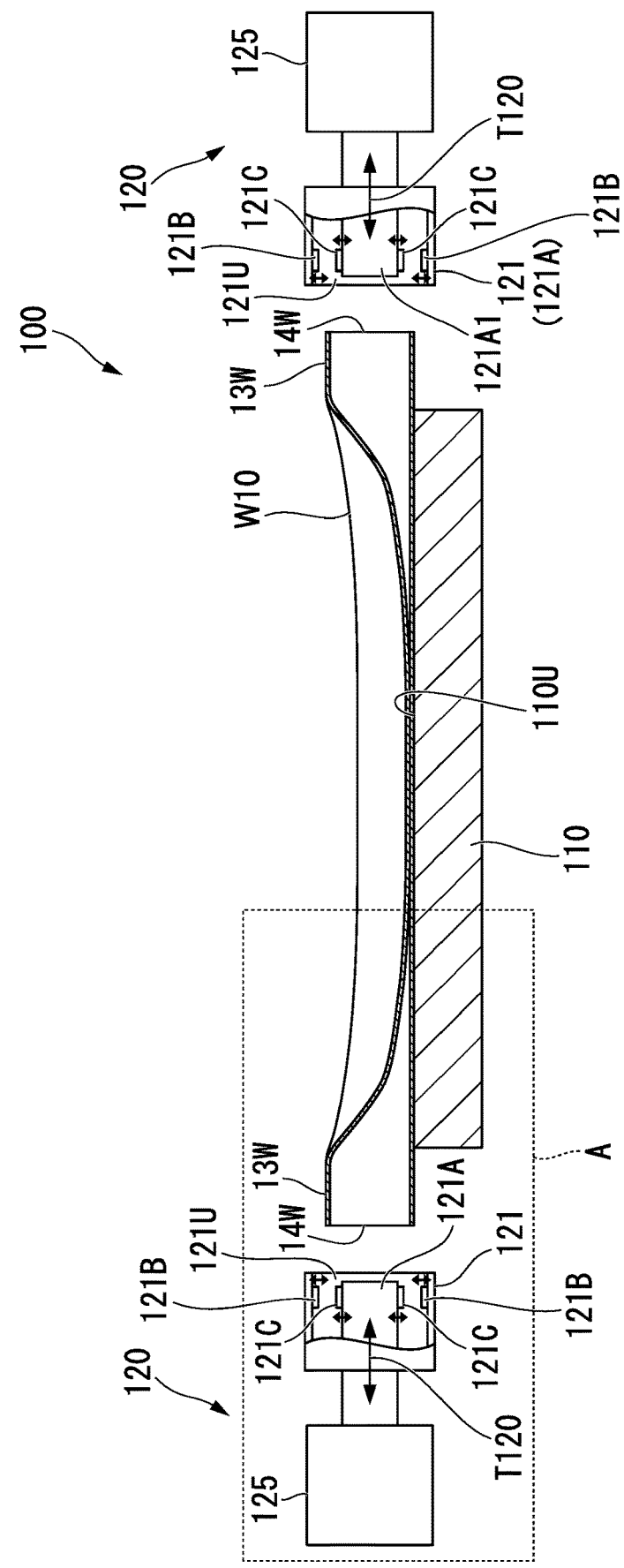
FIG. 7 is a front view describing a schematic configuration of a torsion beam manufacturing apparatus according to the same embodiment.
Figure 8:
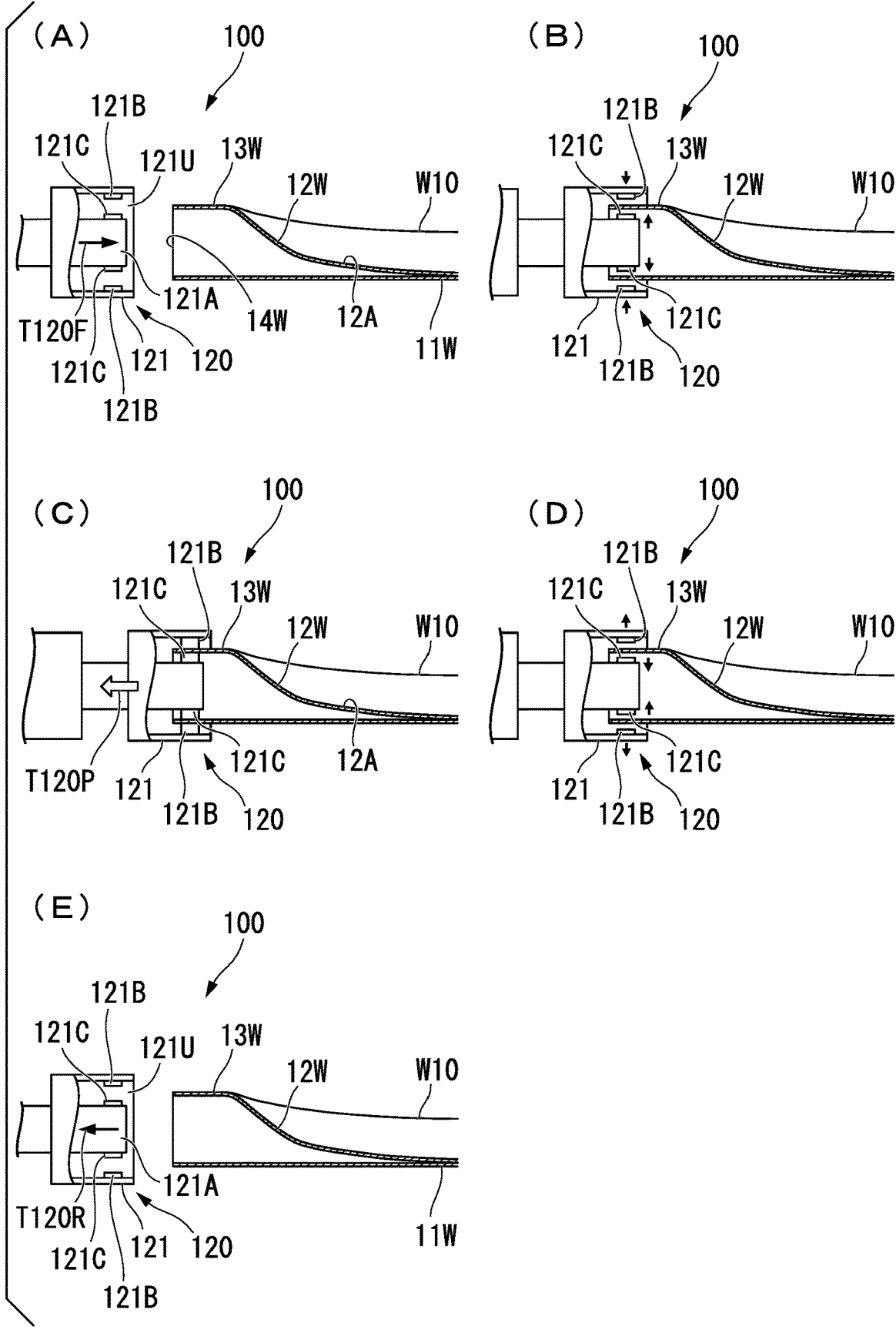
FIG. 8 is a view for describing a pulling treatment step in the step for manufacturing a torsion beam according to the same embodiment along a flow in FIGS. 8(A) to 8(E) and is a view corresponding to A-section in FIG. 7.

Next, with, reference to FIG. 7, a schematic configuration of a torsion beam manufacturing apparatus according to the first embodiment will be described. FIG. 7 is a front view describing a schematic configuration of a torsion beam manufacturing apparatus 100 according to the first embodiment.

The torsion beam manufacturing apparatus 100 includes a torsion beam material support base 110 on which a torsion beam material W10 is placed, two pulling treatment units 120 which pull the torsion beam material W10 in its longitudinal direction, and a control unit (not illustrated).

A recessed part 110U corresponding to an exterior shape of the torsion beam material W10 formed in an upper portion of the torsion beam material support base 110, which stably supports the torsion beam material W10 placed on the recessed part 110U.

In the following description regarding the torsion beam material W10, to be distinguished from the torsion beam 10, portions corresponding to the portions of the torsion beam 10, such as the uniformly shaped closed cross-sectional portion 11, the shape changing portion 12, the attachment closed cross-sectional portion 13, and the attachment portion 14, will be described with distinguishable reference signs, such as a uniformly shaped closed cross-sectional portion 11W, a shape changing portion 12W, an attachment closed cross-sectional portion 13W, and an attachment portion 14W.

As illustrated in FIG. 7, the pulling treatment unit 120 includes an attachment closed cross-sectional portion holding member 121 which holds the attachment closed cross-sectional portion 13W of the torsion beam material W10, a hydraulic cylinder (driving unit) 125 which moves the attachment closed cross-sectional portion holding member 121 forward and rearward in the longitudinal direction of the torsion beam material W10 along an arrow T120, and a control unit. An operation of the pulling treatment unit 120 is controlled by the control unit.

The attachment closed cross-sectional portion holding member 121 includes an attachment closed cross-sectional portion holding member main body 121A in which a protrusion having a shape corresponding to an interior shape of the attachment closed cross-sectional portion 13W is formed along the longitudinal direction of the torsion beam material W10 from the bottom portion of a recessed part 121U, and a plurality of sets of a clamping member 121B and a clamping member 121C disposed to face each other.

The clamping member 121B is connected to a driving unit (not illustrated) such as an actuator and can move forward and rearward from the wall portion of the attachment closed cross-sectional portion holding member main body 121A toward the inside.

The clamping member 121C is connected to a driving unit (not illustrated) such as an actuator and can move forward and rearward from the protrusion of the attachment closed cross-sectional portion holding member main body 121A toward the outside.

The clamping member 121B and the clamping member 121C interpose the vicinity of the attachment portion 14W of the attachment closed cross-sectional portion 13W of the torsion beam material W10 therebetween and hold the attachment portion 14W from the outside and the inside thereof in cooperation with each other.

In a case where an instruction is received from the control unit, the hydraulic cylinder (driving unit) 125 moves the attachment closed cross-sectional portion holding member 121 forward and rearward in the longitudinal direction of the torsion beam material W10 along the arrow T120.

That is, the control unit causes the torsion beam material W10 to be pulled in the longitudinal direction in a state where each of a pair of attachment closed cross-sectional portion holding members 121 is held by the attachment closed cross-sectional portions 13W at both ends of the torsion beam material W10. The present embodiment employs a form in which both ends of the torsion beam material W10 are pulled. However, the embodiment is not limited to only this form. The present embodiment may employ a form in which pulling is applied to the torsion beam material W10 after the pair of attachment closed cross-sectional portion holding members 121 respectively holds the attachment closed cross-sectional portions 13W at both ends of the torsion beam material W10, by fixing the position of one of the pair of attachment closed cross-sectional portion holding members 121 and causing the other thereof to be relatively separated from the one thereof. The same also applies to other embodiments.

Next, with reference to FIGS. 8(A) to 8(E), an overview of the pulling treatment step using the torsion beam manufacturing apparatus 100 will be described. FIGS. 8(A) to 8(F) are views describing the pulling treatment step in a step for manufacturing a torsion beam along a flow in FIGS. 8(A) to 8(E) and are views corresponding to A-section in FIG. 7. The control unit may cause the pulling treatment step described below to be entirely and automatically performed.

(1) First, as illustrated in FIG. 8(A), the torsion beam material W10 is disposed on the torsion beam material support base 110 and is supported, and the attachment closed cross-sectional portion holding member 121 is moved forward in a direction of an arrow T120F.

(2) Next, as illustrated in FIG. 8(B), when the attachment closed cross-sectional portion holding member 121 is positioned in the vicinity of the attachment portion 14W of the attachment closed cross-sectional portion 13W of the torsion beam material W10, the attachment closed cross-sectional portion holding member 121 is stopped.

Then, the clamping member 121B and the clamping member 121C protrude as indicated with the arrow and hold the attachment closed cross-sectional portion 13W.

(3) Subsequently, as illustrated in FIG. 8(C), when the attachment closed cross-sectional portion 13W is held by the clamping member 121B and the clamping member 121C, a hydraulic cylinder (not illustrated) operates, so that the torsion beam material W10 is pulled in a direction of an arrow T120P along the longitudinal direction. In this pulling treatment distortion equal to or greater than 1% is applied to the torsion beam material W10 in its axial direction, so that residual stress on the outer and inner surfaces in the sheet thickness direction can be reliably released.

(4) When pulling of the torsion beam material W10 ends, the torsion beam 10 is completed. Thereafter, as illustrated in FIG. 8(D), the clamping member 121B and the clamping member 121C are retreated as indicated with the arrow. Accordingly, the attachment closed cross-sectional portion 13W held by the attachment closed cross-sectional portion holding member 121 is released.

(5) When the clamping member 121B and the clamping member 121C are retreated to a predetermined position, as illustrated in FIG. 8(E), the attachment closed cross-sectional portion holding member 121 is retreated in a direction of an arrow T120R, and pulling treatment is completed.

Hereinafter, with reference to FIGS. 9(A) to 11(B), an effect of pulling treatment according to the first embodiment will be described.

Figure 9:
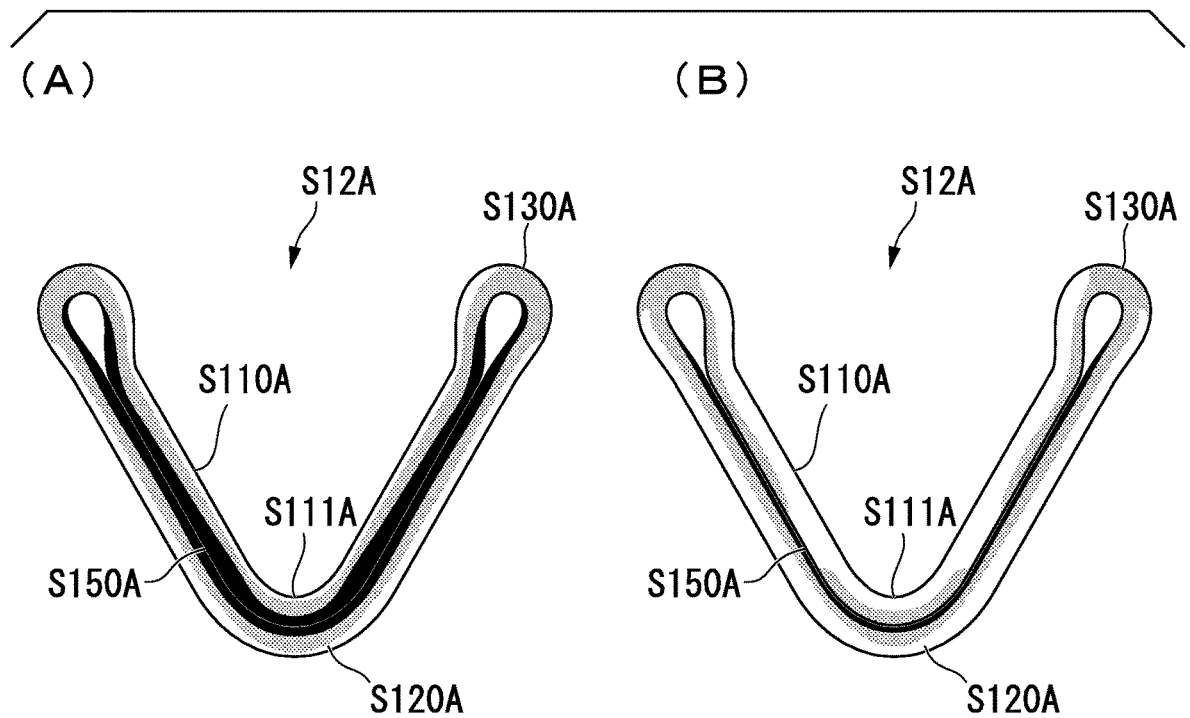
FIG. 9 is a view for describing an effect of pulling treatment in the same embodiment and illustrating stress distributions in a closed cross section corresponding to FIG. 5A.
Figure 10:
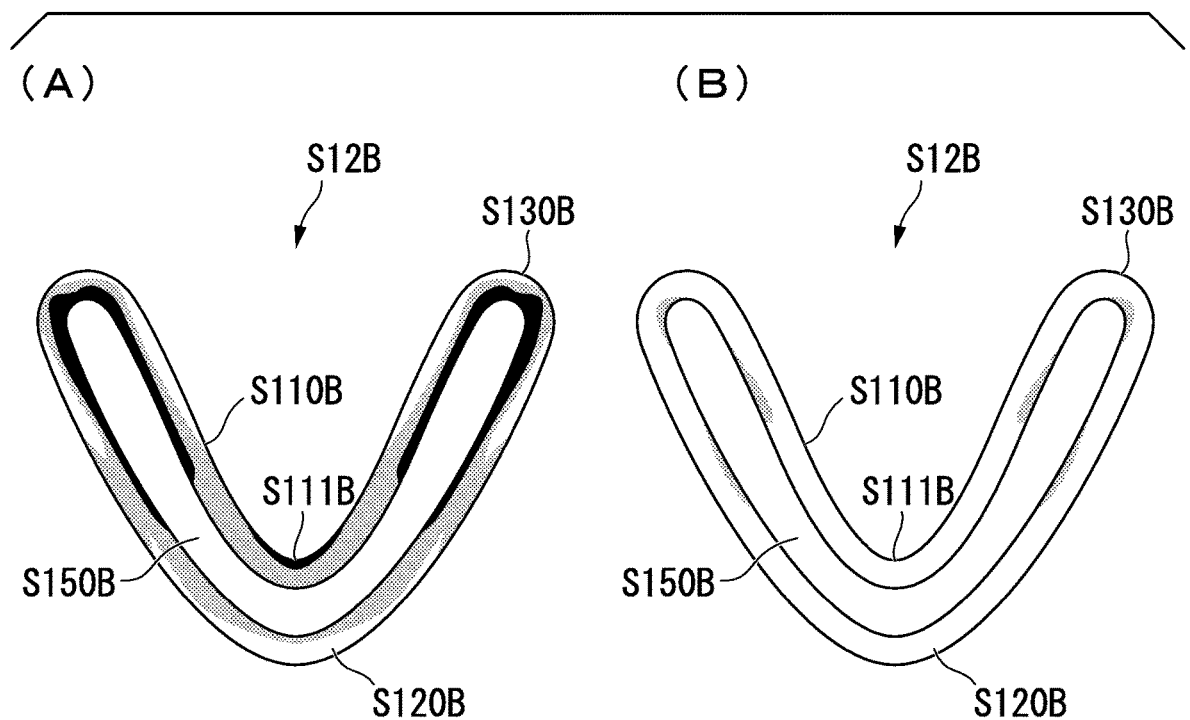
FIG. 10 is a view for describing an effect of pulling treatment in the same embodiment and illustrating stress distributions in a closed cross section corresponding to FIG. 5B.
Figure 11:
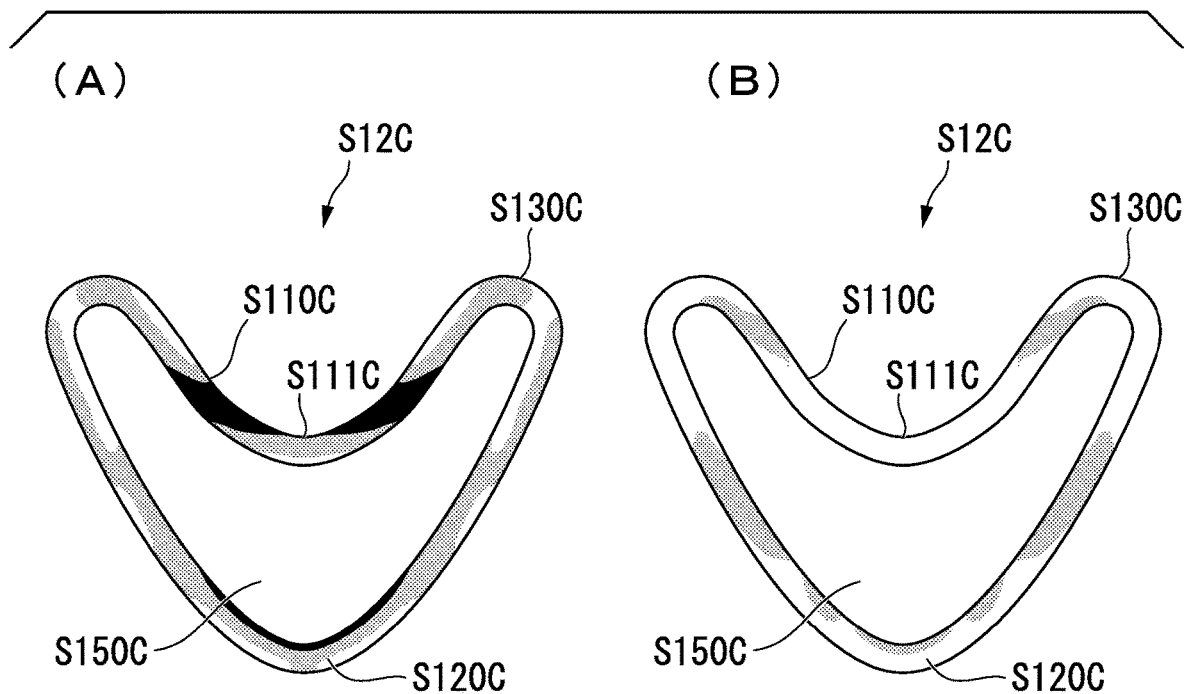
FIG. 11 is a view for describing an effect of pulling treatment in the same embodiment and illustrating stress distributions in a closed cross section corresponding to FIG. 5C.

FIGS. 9(A) to 11(B) are views describing an effect of pulling treatment according to the first embodiment FIGS. 9(A) and 9(B) illustrate stress distributions in a closed cross section at the same position as that in FIG. 5A. FIGS. 10(A) and 10(B) illustrate stress distributions in a closed cross section at the same position as that in FIG. 5B. FIGS. 11(A) and 11(B) illustrate stress distributions in a closed cross section at the same position as that in FIG. 5C. In FIGS. 9(A) to 11(B), the black part indicates a part having high tensile residual stress, the shaded part indicates a part having intermediate tensile residual stress, and the colorless part indicates a part having little tensile residual stress.

First, with reference to FIGS. 9(A) and 9(B), an effect of pulling treatment in the uniformly shaped closed cross-sectional portion 11 will be described. FIG. 9(A) illustrates a stress distribution before pulling treatment, and FIG. 9(B) illustrates a stress distribution after pulling treatment.

In regard to residual stress in the uniformly shaped closed cross-sectional portion 11, in a state at the point of time the torsion beam material W10 is formed, as illustrated in a cross section in FIG. 9(A), high tensile stress is widely distributed in the sheet thickness direction over the substantially entire circumference of the close-contact portion S150A.

In addition, on the second wail portion S120A side forming the projected side outer surface, that is, a part having little tensile residual stress, there is tensile residual stress in approximately ⅓ a region inward from the outside in the sheet thickness direction. Meanwhile, there is little tensile residual stress on the first wall portion S110A side forming the recessed side inner surface.

In contrast, after pulling treatment is performed, as illustrated in a cross section in FIG. 9(B), the distribution of high tensile residual stress is remarkably reduced on both the first wall portion S110A side and the second wall portion S120A side of the close-contact portion S150A, and there is little tensile residual stress. Therefore, fatigue properties can be improved.

Next, with reference to FIGS. 10(A) and 10(B), an effect of pulling treatment in the connection portion 12A will be described. FIG. 10(A) illustrates a stress distribution before pulling treatment, and FIG. 10(B) illustrates a stress distribution after pulling treatment.

In regard to residual stress in the connection portion 12A, in a state at the point of time the torsion beam material W10 is formed, as illustrated in a cross section S12B in FIG.

10(A), high tensile residual stress is distributed from the vicinity of the folded wall portion S130B of a closed cross section inner side S150B to a middle position on the central side in a width direction.

In addition, there is a part having little tensile residual stress outside a substantially central position in the width direction on the second wall portion S120B side forming the protected side outer surface, but there are few parts having little tensile residual stress on the first wall portion S110B side forming the recessed side inner surface.

In contrast, after pulling treatment is performed, as illustrated in a cross section S12B in FIG. 10(B), there is little tensile residual stress over the substantially entire range.

In the cross sections illustrated in FIGS. 10(A) and 10(B) as well, it is possible to achieve an effect of improving fatigue properties similar to that in the cross sections illustrated in FIGS. 9(A) and 9(B) as described above. That is, in the present embodiment, as illustrated in FIG. 10(B), residual stress can be reduced by pulling the torsion beam material W10 in its longitudinal direction, fatigue properties can be improved.

Next, with reference to FIGS. 11(A) and 11(B), an effect of pulling treatment in the shape changing portion 12 will be described. FIG. 11(A) illustrates a stress distribution before pulling treatment, and FIG. 11(B) illustrates a stress distribution after pulling treatment.

In regard to residual stress in the shape changing portion 12, in a state where the torsion beam material W10 is formed, as illustrated in a cross section in FIG. 11(A), residual stress is slightly distributed on an inner side in the sheet thickness direction on the second wall portion S120C side forming the projected side outer surface of a closed cross section inner side S150C. On the first wall portion S110C side forming the recessed side inner surface, high tensile residual stress is distributed over the entire range in the sheet thickness direction from the vicinity of the folded wall portion S130C to the middle of the central side in the width direction.

In addition, there are very low parts having little tensile residual stress on both the first wall portion S110C side and the second wall portion S120C side.

In contrast, after pulling treatment is performed, as in a cross section illustrated in FIG. 11(B), a part having little tensile residual stress spreads drastically, and there is no longer a part of high tensile residual stress.

In the cross sections illustrated in FIGS. 11(A) and 11(B) as well, it is possible to achieve an effect of improving fatigue properties similar to that in the cross sections illustrated in FIGS. 9(A) and 9(B) as described above. That is, in the present embodiment, as illustrated in FIG. 11(B), residual stress can be reduced by pulling the torsion beam material W10 in its longitudinal direction, fatigue properties can be improved.

According to the torsion beam manufacturing method of the first embodiment and the torsion beam manufacturing apparatus 100, the torsion beam 10 having excellent fatigue properties can be efficiently manufactured.

In addition, according to the torsion beam manufacturing method of the first embodiment and the torsion beam manufacturing apparatus 100, since the attachment closed cross-sectional portions 13W of the torsion beam material W10 are held and the connection portions 12A are pulled in the longitudinal direction, the torsion beam material W10 can be pulled over the entire length. As a result, within the entire range of the uniformly shaped closed cross-sectional portion 11W and the shape changing portions 12W of the torsion beam material W10, tensile residual stress can be removed without omission.

<Second Embodimen>

Next, with reference to FIGS. 12 and 13(A) to 13(D), a second embodiment of the present invention will be described.

Figure 12:
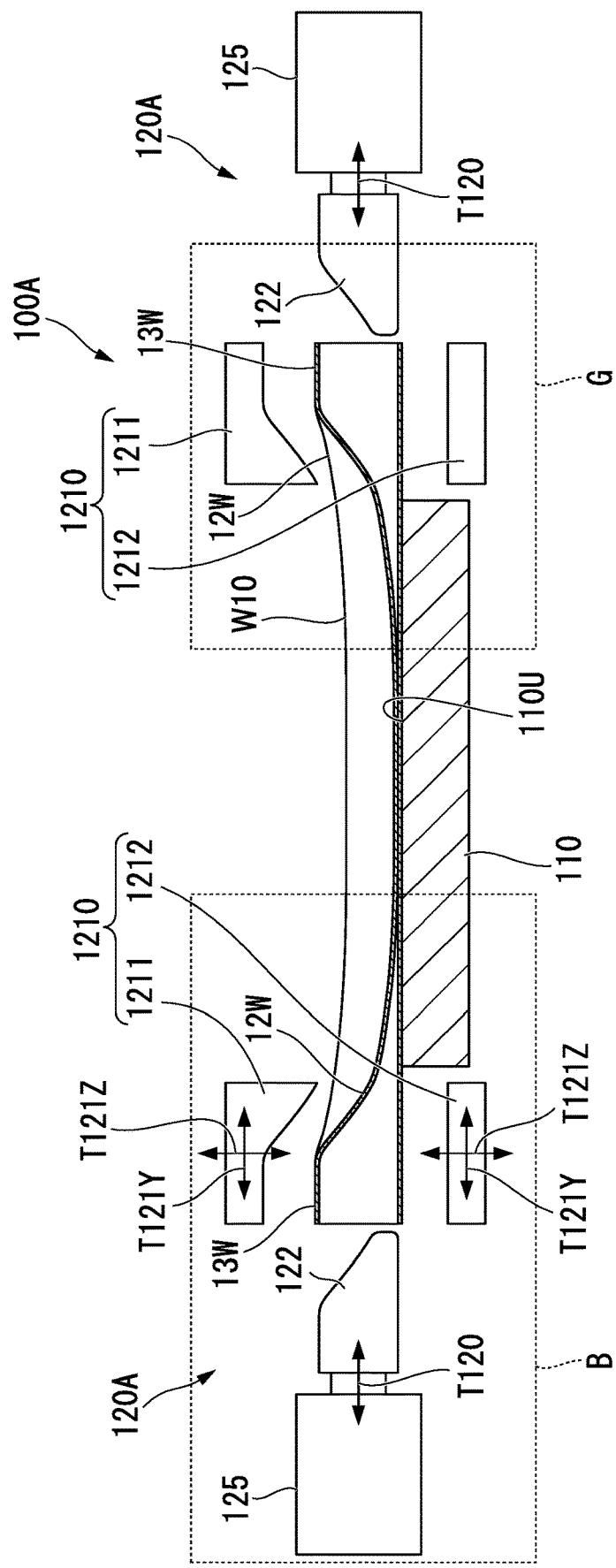
FIG. 12 is a front view describing a schematic configuration of a torsion beam manufacturing apparatus according to a second embodiment of the present invention.

FIG. 12 is a front view describing a schematic configuration of a torsion beam manufacturing apparatus according to the second embodiment of the present invention. FIGS. 13(A) to 13(D) describing an overview of the step for manufacturing a torsion beam according to the second embodiment. In FIG. 12, a reference sign 100A indicates a torsion beam manufacturing apparatus.

The second embodiment is different from the first embodiment in regard to the way of holding the torsion beam material W10 when the torsion beam material W10 is subjected to pulling treatment.

Hereinafter, with reference to FIG. 12, a schematic configuration of a torsion beam manufacturing apparatus 100A according to the second embodiment will be described.

As illustrated in FIG. 12, the torsion beam manufacturing apparatus 100A Includes the torsion beam material support base 110 on which, the torsion beam material W10 is placed, a pair of pulling treatment units 120A which pull the torsion beam material W10 in the longitudinal direction, and a control unit (not illustrated).

As illustrated, in FIG. 12, the pulling treatment unit 120A includes a shape changing portion outside holding member 1210 which holds the shape changing portion 12W and the attachment closed cross-sectional portion 13W from the outside, a shape changing portion support punch (inside support member) 122 which supports the shape changing portion 12W and the attachment closed cross-sectional portion 13W from the inside, and the hydraulic cylinder 125 which moves the shape changing portion support punch 122 forward and rearward in the direction of the arrow T120 along the longitudinal direction of the torsion beam material W10.

The shape changing portion outside holding member 1210 includes an upper exterior shape holding portion 1211 which is formed to correspond to upper exterior shapes of the shape changing portion 12W and the attachment closed cross-sectional portion 13W of the torsion beam material W10, a lower exterior shape holding portion 1212 which is formed to correspond to lower exterior shapes of the shape changing portion 12W and the attachment closed cross-sectional portion 13W, and a driving unit (not illustrated) such as an actuator which moves the upper exterior shape holding portion 1211 and the lower exterior shape holding portion 1212 forward and rearward in a direction of an arrow T121Y (pulling direction) and a direction of an arrow T121Z (holding direction).

The upper exterior shape holding portion 1211 includes an upper exterior shape holding shape portion formed complementarity to the upper exterior shapes of the shape changing portion 12W and the attachment closed cross-sectional portion 13W and is connected to the driving unit (not illustrated).

The lower exterior shape holding portion 1212 includes a lower exterior shape holding shape portion formed complementarity to the lower exterior shapes of the shape changing portion 12W and the attachment closed cross-sectional portion 13W and is connected to the driving unit (not illustrated).

For example, the shape changing portion support punch 122 is formed to correspond to interior shapes of the shape changing portion 12W and the attachment closed cross-sectional portion 13W, is able to be inserted into the shape changing portion 12W, and supports the shape changing portion 12W from the inside thereof.

Specifically, the shape changing portion support punch 122 has a shape of holding the inner side of the shape changing portion formed complementarily to the interior shape of the shape changing portion 12W.

The pulling treatment unit 120A is controlled by the control unit (not illustrated).

Specifically, the hydraulic cylinder 125 receives an instruction from the control unit and moves the shape changing portion support punch 122 forward and rearward in the direction of the arrow T120.

Hereinafter, with reference to FIGS. 13(A) to 13(D), an example of an overview of a torsion beam manufacturing step performed by the torsion beam manufacturing apparatus 100A the described. FIGS. 13(A) to 13(D) are views describing an overview of the step for manufacturing a torsion beam according to the second embodiment.

Figure 13:
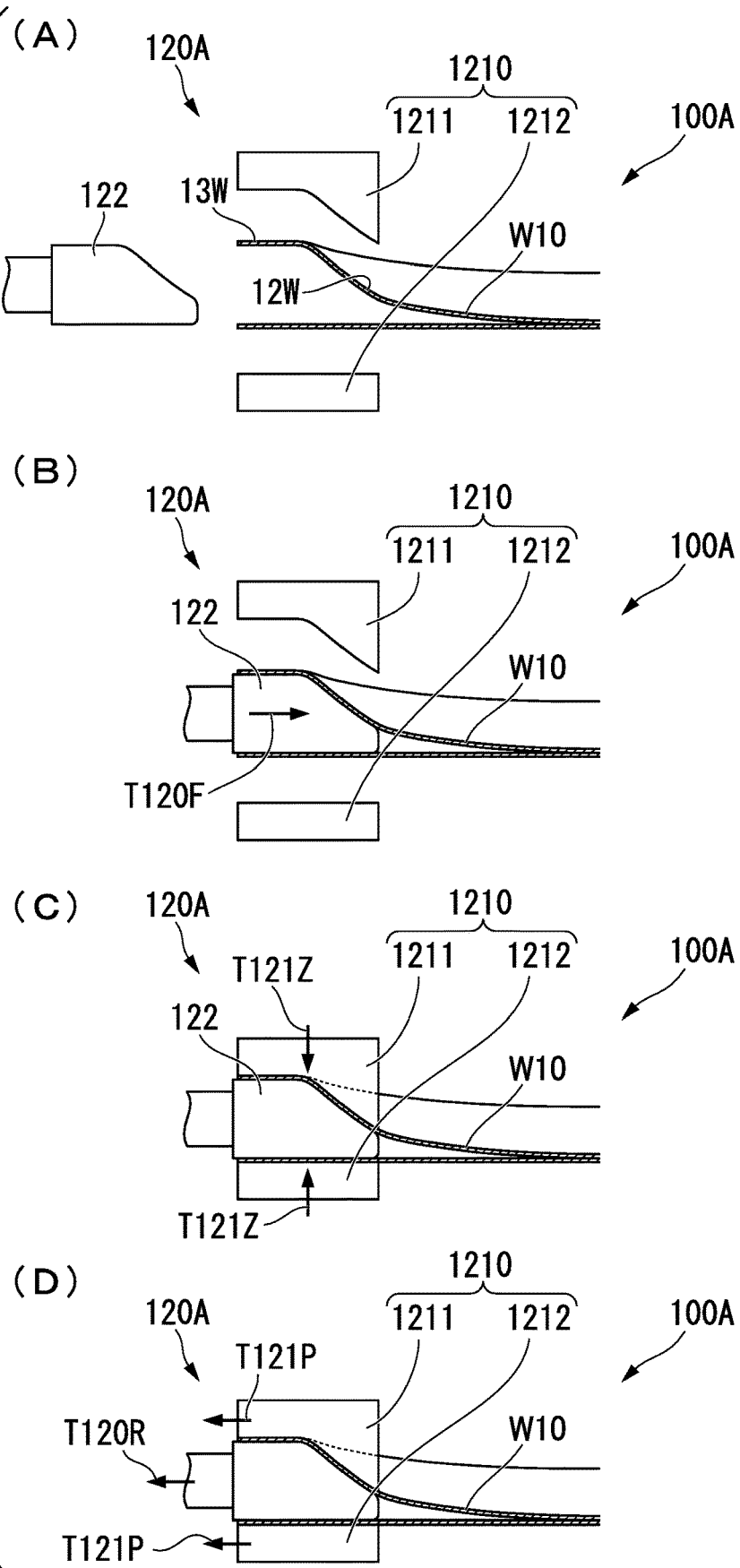
FIG. 13 is a view describing a step for manufacturing a torsion beam according to the same embodiment along a flow in FIGS. 13(A) to 13(D) and is a view corresponding to B-section in FIG. 12.

(1) First, as illustrated in FIGS. 12 and 13(A), the torsion beam material W10 is disposed on the torsion beam material support base 110 and is supported, and the shape changing portion outside holding member 1210 is disposed at a predetermined position.

(2) Next, as illustrated in FIG. 13(B), the shape changing portion support punch 122 is moved forward in the direction of the arrow T120F and is inserted into the shape changing portion 12W. When the shape changing portion support punch 122 supports the shape changing portion 12W from the inside, the shape changing portion support punch 122 is stopped.

(3) Subsequently, as illustrated in FIG. 13(C), the driving unit (not illustrated) moves the upper exterior shape holding portion 1211 and the lower exterior shape holding portion 1212 forward in the direction of the arrow T121Z, and the upper exterior shape holding portion 1211 and the lower exterior shape holding portion 1212 hold the shape changing portion 12W and the attachment closed cross-sectional portion 13W in an upward/downward direction.

(4) Subsequently, as illustrated in FIG. 13(D), the shape changing portion 12W and the attachment closed cross-sectional portion 13W are supported by the shape changing portion support punch 122 from the inside and are pulled in a direction of an arrow T121P in a state where the upper exterior shape holding portion 1211 and the lower exterior shape holding portion 1212 hold the shape changing portion 12W and the attachment closed cross-sectional portion 13W, and the torsion beam 10 is thereby formed. At this time, the shape changing portion support punch 122 moves in a direction of an arrow T120R while being synchronized with or following the upper exterior shape holding portion 1211 and the lower exterior shape holding portion 1212. In this pulling treatment, distortion equal to or greater than 1% is applied to the torsion beam material W10 in its axial direction, so that tensile residual stress on the outer and inner surfaces in the sheet thickness direction can be reliably released.

According to the torsion beam manufacturing method of the second embodiment and the torsion beam manufacturing apparatus 100A, residual stress of the connection portion 12A is reduced, and the torsion beam 10 having excellent fatigue properties can be efficiently manufactured.

In addition, according to the torsion beam manufacturing apparatus 100A, the shape changing portion support punch 122 is inserted into the shape changing portion 12W and the attachment closed cross-sectional portion 13W, so that the shape changing portion support punch 122 supports the shape changing portion 12W and the attachment closed cross-sectional portion 13W from the inside thereof. Then, the torsion beam material W10 is pulled in its longitudinal direction in a state where the upper exterior shape holding portion 1211 and the lower exterior shape holding portion 1212 hold the shape changing portion 12W and the attachment closed cross-sectional portion 13W. Therefore, it is possible to perform stable pulling treatment while preventing the shape changing portion 12W from being distorted in a squashing manner.

<Third Embodiment>

Next, with reference to FIGS. 14 to 16(E), a third embodiment of the present invention will be described.

Figure 14:
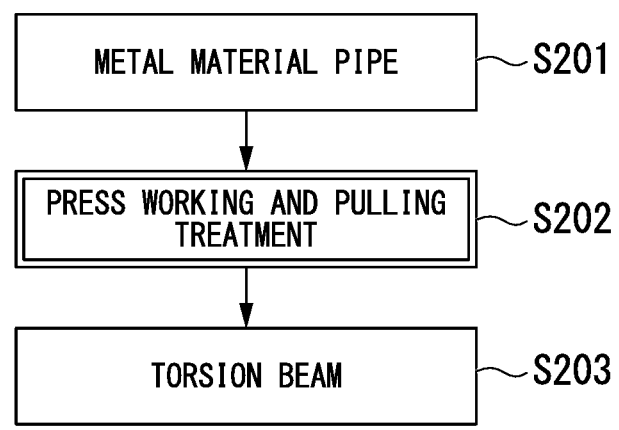
FIG. 14 is a flowchart describing a step for manufacturing a torsion beam according to a third embodiment of the present invention.
Figure 15:
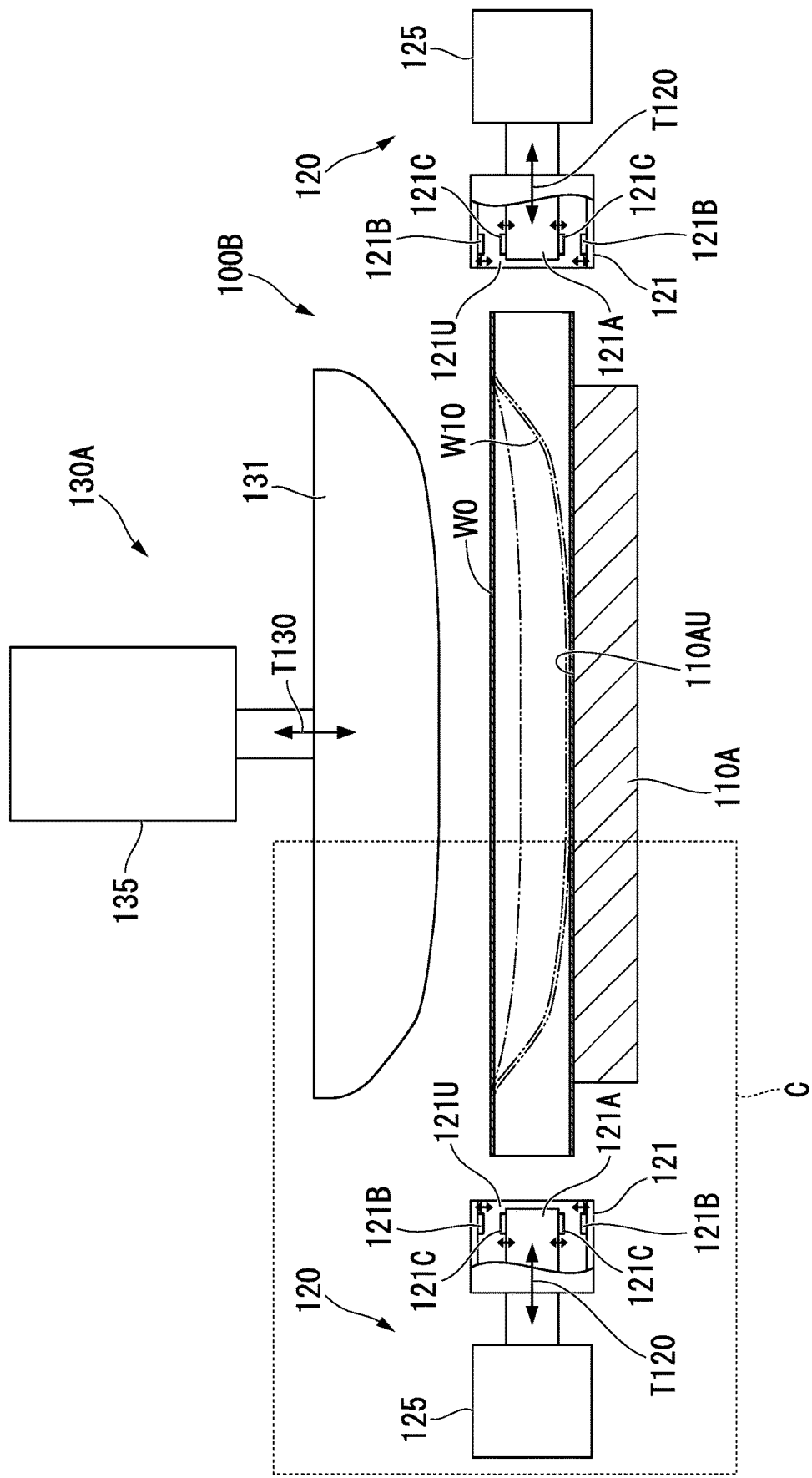
FIG. 15 is a front view describing a schematic configuration of a torsion beam manufacturing apparatus according to the same embodiment.
Figure 16:
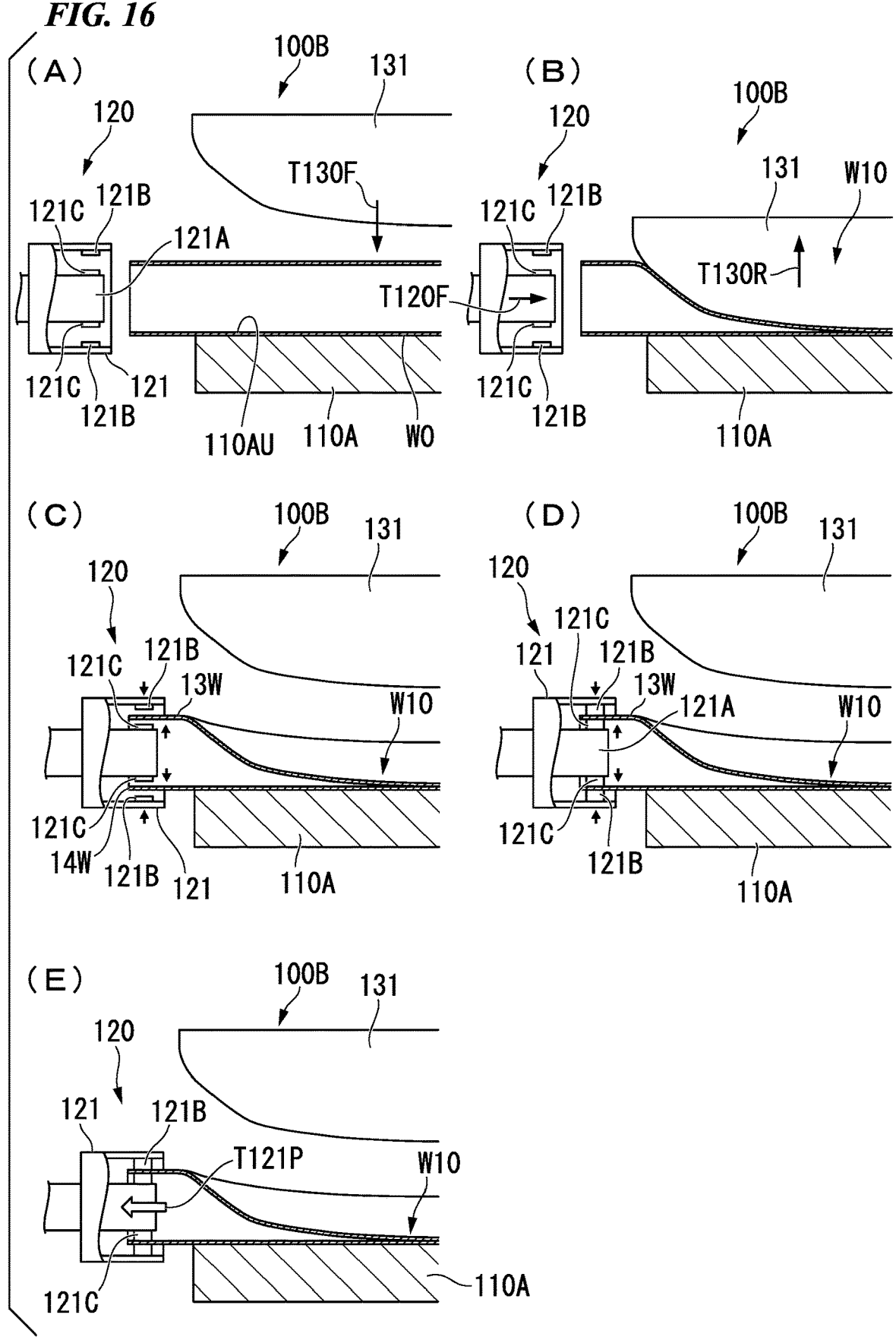
FIG. 16 is a view describing a step for manufacturing a torsion beam according to the same embodiment along a flow in FIGS. 16(A) to 16(E) and is a view corresponding to C-section in FIG. 15.

FIG. 14 is a flowchart describing a step for manufacturing a torsion beam according to the third embodiment of the present invention. In addition, FIG. 15 is a front view describing a schematic eon figuration of a torsion beam manufacturing apparatus according to the present embodiment. FIGS. 16(A) to 16(E) are views describing an overview of the step for manufacturing a torsion beam according to the present embodiment. In FIG. 15, a reference sign 100B indicates a torsion beam manufacturing apparatus.

In the first embodiment, the press working step is performed in advance to form the torsion beam material W10. Thereafter, the torsion beam material W10 is subjected to pulling treatment by the torsion beam manufacturing apparatus 100 and the torsion beam 10 is thereby manufactured. In contrast in the present embodiment, both press working and pulling treatment are performed by the torsion beam manufacturing apparatus 100A. Other configurations of the present embodiment are similar to those of the first embodiment.

Hereinafter, with reference to FIG. 14, the torsion beam manufacturing step according to the present embodiment will be described.

(1) A metal material pipe is prepared (Step S201).

As the metal material pipe to be prepared, for example, it is possible to use a circular steel pipe having a uniform thickness.

(2) Next, in press working and pulling treatment steps, the metal material pipe is subjected to press working and pulling treatment (Step S202).

In the press working and pulling treatment steps, the torsion beam material W10 is formed through press working of the metal material pipe. Thereafter, in the installation state thereof with no change, the torsion beam material W10 is subjected to pulling treatment in succession. In this pulling treatment, distortion equal to or greater than 1% is applied to the torsion beam material W10 in its axial direction, so that tensile residual stress on the outer and inner surfaces in the sheet thickness direction can be reliably released.

(3) By performing press working and pulling treatment in Step S202, the torsion beam 10 is formed (Step S203).

Next, with reference to FIG. 15, a schematic configuration of the torsion beam manufacturing apparatus 100B according to the present embodiment will be described.

As illustrated in FIG. 15, the torsion beam manufacturing apparatus 100B includes a feed press forming die 110A, the pair of pulling treatment units 120, a movable-type press forming driving apparatus 130A, and a control unit (not illustrated).

In the torsion beam manufacturing apparatus 100B, the fixed press forming die 110A and the movable-type press forming driving apparatus 130A constitute a press machine, and the pair of pulling treatment units 120 constitutes a pulling treatment machine.

The configuration and the operation of the pulling treatment unit 120 are similar to those of the first embodiment. Therefore, the same reference signs are applied and duplicated description will be omitted.

A recessed part 110AU, which is used when a metal material pipe is subjected to press working and to obtain the torsion beam material W10, is formed in the fixed press forming die (forming die) 110A. That is, the recessed part 110AU having a shape corresponding to a lower surface of the torsion beam material W10 is formed in the fixed press forming die 110A while facing upward.

In addition, the fixed press forming die 110A also serves as a torsion beam material support base supporting the torsion beam material W10 when the torsion beam material W10 is subjected to pulling treatment by the pair of pulling treatment units 120.

The movable-type press forming driving apparatus B0A includes a movable press forming die (forming die) 131 and a hydraulic cylinder (driving unit) 135 which moves the movable press forming die 131 forward and rearward in a direction of an arrow T130 (upward and downward).

The movable press forming die 131 has a shape portion for forming the torsion beam material W10, and forms the torsion beam material W10 in cooperation with the fixed press forming die 110A. A shape corresponding to an upper surface of the torsion beam material W10 is formed on a lower surface of the movable press forming die 131 while lacing downward.

The control unit (not illustrated) instructs each of the polling treatment units 120 and the movable-type press forming driving apparatus 130A to perform an operation related to press working and pulling treatment.

Hereinafter, with reference to FIGS. 16(A) to 16(E), an overview of the torsion beam manufacturing step perforated by the torsion beam manufacturing apparatus 100B will be described. FIGS. 16(A) to 16(E) are views describing the step for manufacturing a torsion beam according to the present embodiment along a flow in FIGS. 16(A) to 16(E) and are views corresponding to C-section in FIG. 15.

(1) First, as illustrated in FIG. 16(A), a metal material pipe W0 is placed on the fixed press forming die 110A, and the movable press forming die 131 is moved in a direction of an arrow T130F (downward).

(2) Next, as illustrated in FIG. 16(B), when the torsion beam material W10 is formed, the movable press forming die 131 is moved in a direction of an arrow T130R (upward). Then, the attachment closed cross-sectional portion holding member 121 is moved forward in the direction of the arrow T120F.

(3) Subsequently, as illustrated in FIG. 16(C), when the attachment closed cross-sectional portion holding member 121 is positioned in the vicinity of the attachment portion 14W of the attachment closed cross-sectional portion 13W of the torsion beam material W10, moving forward of the attachment closed cross-sectional portion holding member 121 is stopped.

Then, the clamping member 121B and the clamping member 121C are caused to protrude in the arrow direction such that both approach each other.

(4) Subsequently, as illustrated in FIG. 16(D), the attachment closed cross-sectional portion 13W is interposed between the clamping member 121B and the clamping member 121C such that the vicinity of the attachment portion 14W of the torsion beam material W10 is held.

(5) Subsequently, as illustrated in FIG. 16(E), in a state where the attachment closed cross-sectional portion 13W is held by the clamping member 121B and the clamping member 121C with no change, the hydraulic cylinder (hydraulic cylinder 125 illustrated in FIG. 15) is operated, the torsion beam material W10 is subjected to pulling treatment in the direction of the arrow T120P along its longitudinal direction, and the torsion beam 10 is thereby formed. In this pulling treatment, the distortion equal to or greater than 1% is applied to the torsion beam material W10 in its axial direction, so that tensile residual stress on the outer and inner surfaces in the sheet thickness direction can be reliably released.

After the torsion beam 10 is formed, the operation is similar to that described by lining FIGS. 8(D) and 8(F) in the first embodiment. Here, duplicated description will be omitted.

According to the torsion beam manufacturing method of the present embodiment and the torsion beam manufacturing apparatus 100B, the torsion beam 10 having excellent fatigue properties can be efficiently manufactured.

In addition, according to the torsion beam manufacturing apparatus 100B of the present embodiment, after the metal material pipe W0 is pressed and the torsion beam material W10 is formed, the torsion beam 10 is manufactured by pulling the torsion beam material W10 in succession without transferring the torsion beam material W10 to another apparatus. Therefore, productivity can be improved.

<Fourth Embodiment>

Next, with reference to FIGS. 17 to 18(E), a fourth embodiment of the present invention will be described.

Figure 17:
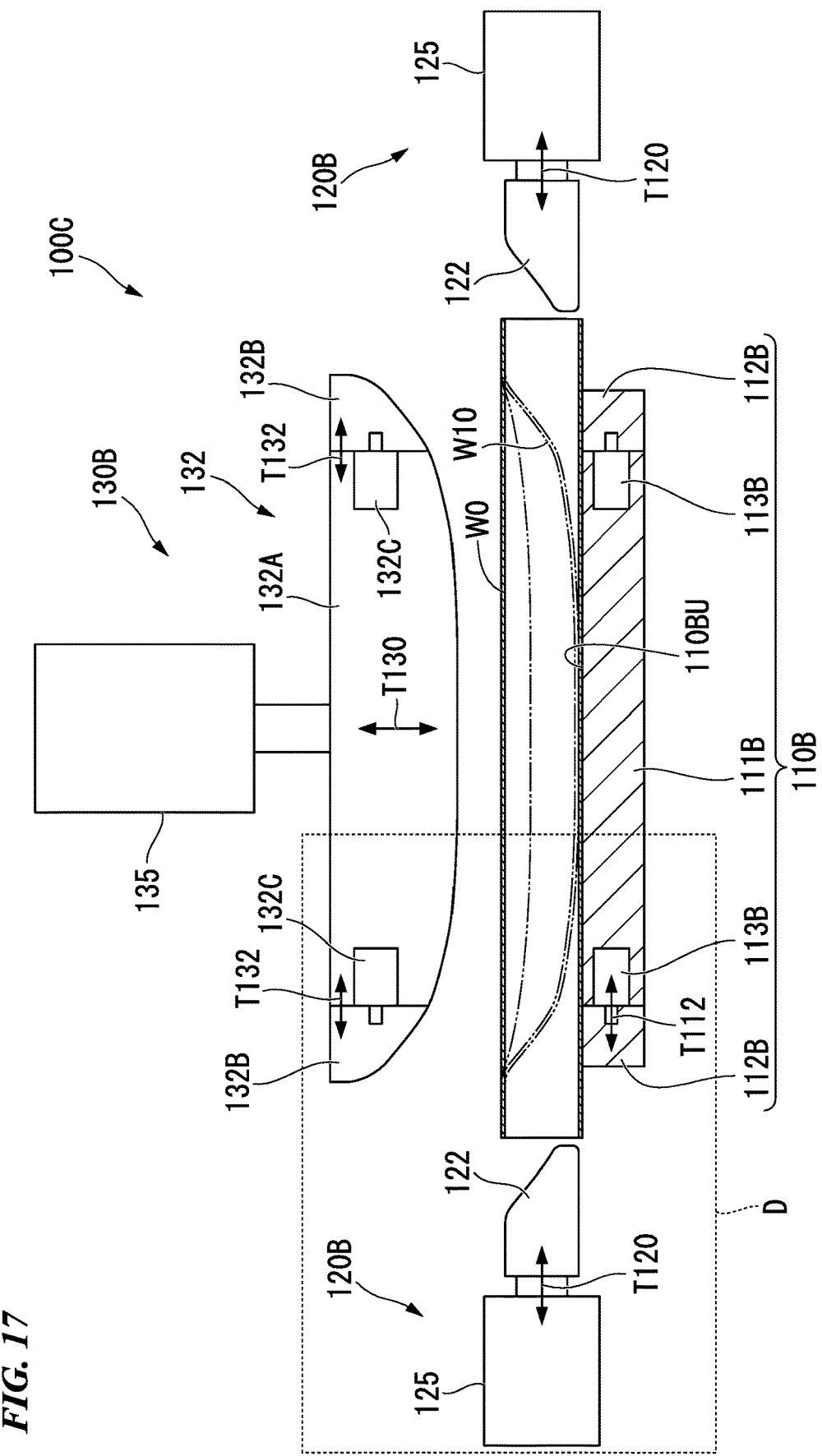
FIG. 17 is a front view describing a schematic configuration of a torsion beam manufacturing apparatus according to a fourth embodiment of the present invention.
Figure 18:
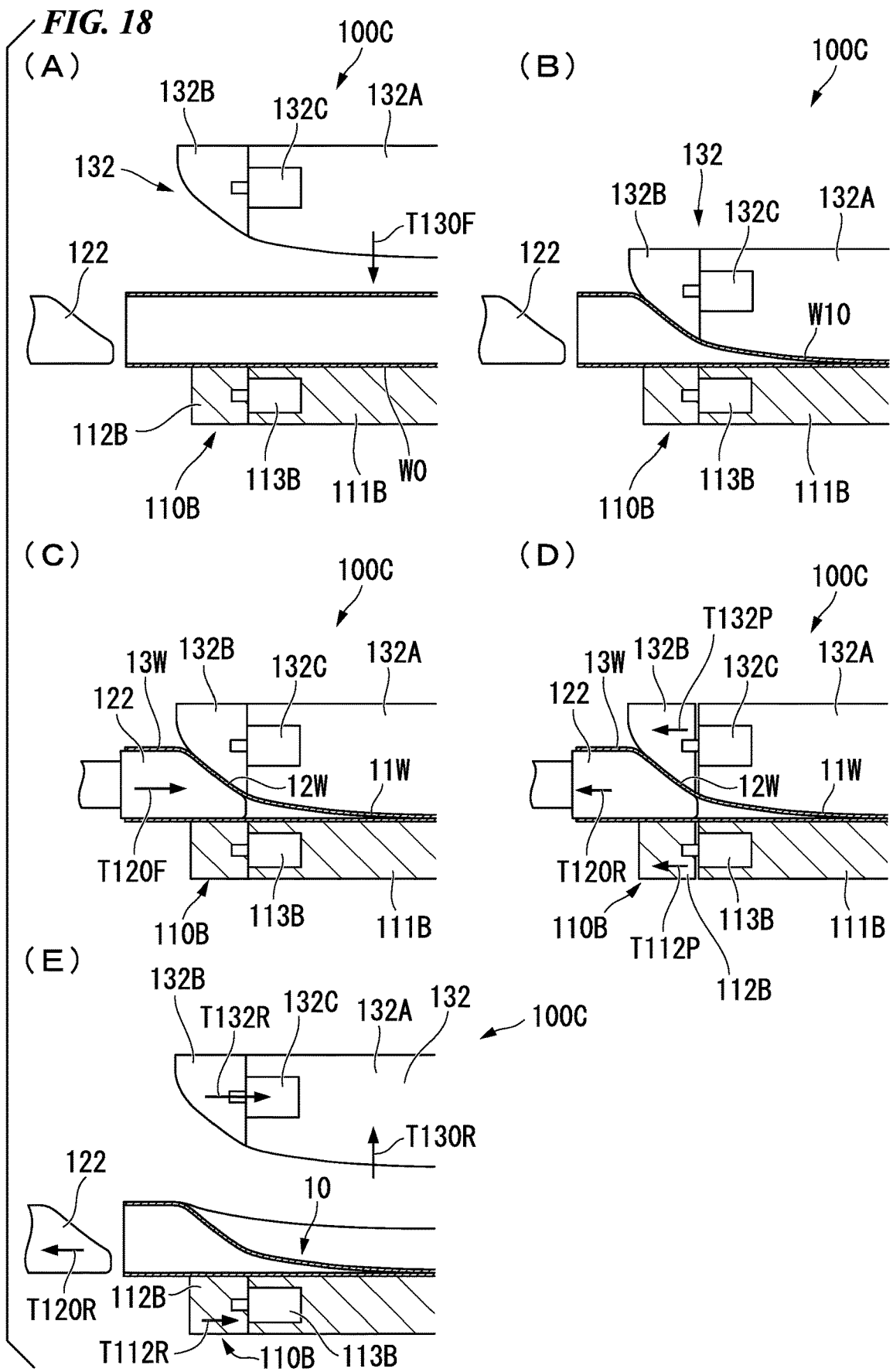
FIG. 18 is a view describing a step for manufacturing a torsion beam according to the same embodiment along a flow in FIGS. 18(A) to 18(E) and is a view corresponding to D-section in FIG. 17.

FIG. 17 is a front view describing a schematic configuration of a torsion beam manufacturing apparatus 100C according to the present embodiment. FIGS. 18(A) to 18(E) are views describing an overview of a step for manufacturing a torsion beam according to the present embodiment along a flow in FIGS. 18(A) to 18(E) and are views corresponding to D-section FIG. 17.

Hereinafter, with reference to FIG. 17, a schematic configuration of the torsion beam manufacturing apparatus 100C according to the present embodiment will be described.

The torsion beam manufacturing apparatus 100C includes a fixed press forming die (forming die) 110B, a pair of pulling treatment units 120B, a movable-type press forming driving apparatus 130B, and a control unit (not illustrated).

In the torsion beam manufacturing apparatus 100C, the fixed press forming die 110B and the movable-type press forming driving apparatus 130B constitute a press machine, and the pair of pulling treatment units 120B constitutes a pulling treatment machine.

A recessed part 110BU, which is used when the metal material pipe W0 is subjected to press working and the torsion beam material W10 is obtained, is formed in the fixed press forming die (forming die) 110B. That is, the recessed part 110BU having a shape corresponding to the lower surface of the torsion beam material W10 is formed in the fixed press forming die 110B while facing upward.

In addition, the fixed press forming die 110B also serves as a torsion beam material support base supporting the torsion beam material W10 when the torsion beam material W10 is subjected to pulling treatment by the pair of pulling treatment units 120B.

The fixed press forming die 110B includes a first support portion 111B which has a shape corresponding to the uniformly shaped closed cross-sectional portion 11W of the torsion beam material W10, a pair of second support portions 112B which has shapes corresponding to the shape changing portion 12W and the attachment closed cross-sectional portion 13W, and an actuator (shape change absorption unit) 113B such as a hydraulic cylinder which is disposed inside the first support portion 111B and moves the second support portions 112B forward and rearward in a direction of an arrow T112 with respect to the first support portion 111B. The actuator 113B is provided one each for the second support portions 112B, The movable-type press forming driving apparatus 130B includes a movable press forming die (forming die) 132 and the hydraulic cylinder (driving unit) 135 which moves the movable press forming die 132 forward and rearward in the direction of the arrow T130 (upward and downward).

A shape corresponding to the upper shape of the torsion beam material W10 is formed on a lower surface of the movable press forming die 132, which performs press working of the metal material pipe W0 in cooperation with the fixed press forming die 110B, and the torsion beam material W10 is thereby obtained.

As illustrated in FIG. 17, each of the pulling treatment units 120B includes a shape changing portion support punch (inside support member) 122 and the hydraulic cylinder 125 which moves the shape changing portion support punch 122 forward and rearward in the direction of the arrow T120 along the longitudinal direction of the torsion beam material W10.

Each of the shape changing portion support punches 122 is formed into a shape corresponding to the interior shapes of the shape changing portion 12W and the attachment closed cross-sectional portion 13W, is inserted into the shape changing portion 12W, and supports the shape changing portion 12W from the inside thereof.

Specifically, each of the shape changing portion support punches 122 includes a shape portion holding the inner side of the shape changing portion, formed complementary to the interior shape of the shape changing portion 12W.

Each of the hydraulic cylinders 125 moves the shape changing portion support punch 122 forward and rearward in the direction of the arrow T120 in accordance with an instruction from the control unit (not illustrated).

The movable-type press forming driving apparatus 130B includes a movable press forming die (forming die) 132 and the hydraulic cylinder (driving unit) 135 which moves the movable press forming die 132 forward and rearward in the direction of the arrow T130 (upward and downward).

As illustrated in FIG. 17, the movable press forming die 132 includes a first forming portion 132A, two second forming dies (shape changing portion support members) 132B which are respectively disposed on both sides of the first forming portion 132A in the longitudinal direction, and a pair of hydraulic cylinders (shape changing portion support member driving units) 132C which moves the second forming portions 132B forward and rearward in a direction of an arrow T132.

A shape corresponding to the upper shape of the torsion beam material W10 is formed on a lower surface of the movable press forming die 132, which performs press forming of the torsion beam material W10 in cooperation with the fixed press forming die 110B.

The control unit (not illustrated) instructs each of the actuators 113B of the fixed press forming die 110B, each of the pulling treatment units 120B, and the movable-type press forming driving apparatus 130B to perform an operation related to press working and pulling treatment.

Each of the actuators 113B is displaced in accordance with a shape change (extension) in the longitudinal direction entailed in a forming process of the torsion beam material W10. Specifically, each of the actuators 113B operates while being synchronized with or following each of the hydraulic cylinders (shape changing portion support member driving units) 132C.

The control unit causes each of the actuators 113B of the fixed press forming die 110B and each of the hydraulic cylinders (shape changing portion support member driving units) 132C disposed in the movable press forming die 132 to be synchronized and to move forward and rearward.

Each of the hydraulic cylinders 125 operates while being synchronized with or following each of the actuators 113B and each of the hydraulic cylinders 132C.

Hereinafter, with reference to FIGS. 18(A) to 18(E), an overview of the torsion beam manufacturing step performed by the torsion beam manufacturing apparatus 100C will be described. FIGS. 18(A) to 18(B) are views describing the step for manufacturing a torsion beam according to the present embodiment along a flow in FIGS. 18(A) to 18(E) and are views corresponding to D-section in FIG. 17.

(1) First, as illustrated in FIG. 18(A), the metal material pipe W0 is placed on the fixed press forming die 110B, and the movable press forming die 132 is moved in the direction of the arrow T130F.

At this time, each of the actuators 113B retreats such that the first support portion 111B and the second support portions 112B are integrated, and the recessed part 110BU having a shape corresponding to the lower shape of the torsion beam material W10 is formed.

(2) Then, as illustrated in FIG. 18(B), the metal material pipe W0 is interposed between the fixed press forming die 110B and the movable press forming die 132, and is subjected to press forming to obtain the torsion beam material W10.

(3) Next, as illustrated in FIG. 18(C), the shape changing portion support punch 122 is moved forward in the direction of the arrow T120F and is inserted until the shape changing portion support punch 122 reaches the inside of the shape changing portion 12W. As a result, the shape changing portion support punch 122 abuts on the shape changing portion 12W of the torsion beam material W10 and supports the shape changing portion 12W and the attachment closed cross-sectional portion 13W from the inside thereof.

(4) Then, as illustrated in FIG. 18(D), the cylinders 132C and the actuators 113B operate in cooperation with each other such that the second forming portion 132B is moved forward in a direction of an arrow T132P, and the torsion beam material W10 is pulled in the longitudinal direction in a state where the shape changing portion 12W is supported by the shape changing portion support punch 122 and the second forming portion 132B. In addition, the second support portions 112B moves forward in a direction of an arrow T112P synchronously with the second forming portion 132B and forms the torsion beam 10. At this time, the shape changing portion support punch 122 is synchronized with the second forming portion 132B and the second support portions 112B and retreats in the direction of the arrow T120R.

In this pulling treatment, the distortion equal to or greater than 1% is applied to the torsion beam material W10 in its axial direction, so that tensile residual stress on the outer and inner surfaces in the sheet thickness direction can be reliably released.

(5) When the torsion beam 10 is formed, as illustrated in FIG. 18(F), the second forming portion 132B is caused to retreat in a direction of an arrow T132R by the cylinder 132C, and the second support portions 112B is caused to retreat in a direction of an arrow T112R by the actuator 113B. In addition, the shape changing portion support punch 122 retreats in the direction of the arrow T120R. In addition, the movable press forming die 132 moves in the direction of the arrow T130R (moves upward).

According to the torsion beam manufacturing method and the torsion beam manufacturing apparatus 100C of the present embodiment, the torsion beam 10 having excellent fatigue properties can be efficiently manufactured.

In addition, according to the torsion beam manufacturing apparatus 100C, since the torsion beam material W10 is pulled in its longitudinal direction in a state where the shape changing portion support punch 122 and the second forming portion 132B hold the shape changing portion 12W in cooperation with each other, tensile residual stress of the connection portion 12A can be reduced or removed.

In addition, according to the torsion beam manufacturing apparatus 100C, there is provided the actuator 113B which is displaced in accordance with a shape change in the longitudinal direction entailed in pulling working of the torsion beam material W10 when the torsion beam material W10 is pulled in the longitudinal direction. Therefore, even in a case where the exterior shape of the torsion beam W10 on the central side in the longitudinal direction is greater than those of both sides, pulling treatment can be easily performed.

In addition, according to the torsion beam manufacturing apparatus 100C, since there is provided the actuator 113B, it is possible to prevent damage to the torsion beam material W10 when performing pulling treatment and to efficiently reduce residual stress.

In addition, according to the torsion beam manufacturing apparatus 100C, after the metal material pipe W0 is subjected, to press working and the torsion beam material W10 is formed, the torsion beam material W10 is pulled in succession without being transferred to another apparatus, and the torsion beam 10 can be thereby manufactured. Therefore, productivity can be improved.

In addition, according to the torsion beam manufacturing apparatus 100C, since the hydraulic cylinders (shape changing portion support member driving units) 132C move the second forming portion 132B forward and rearward in the direction of the arrow T132, a moving speed or a moving timing of the second forming portion 132B can be controlled easily and efficiently.

<Fifth Embodiment>

Next, with reference to FIGS. 19 to 20(E), a fifth embodiment of the present invention will be described.

Figure 19:
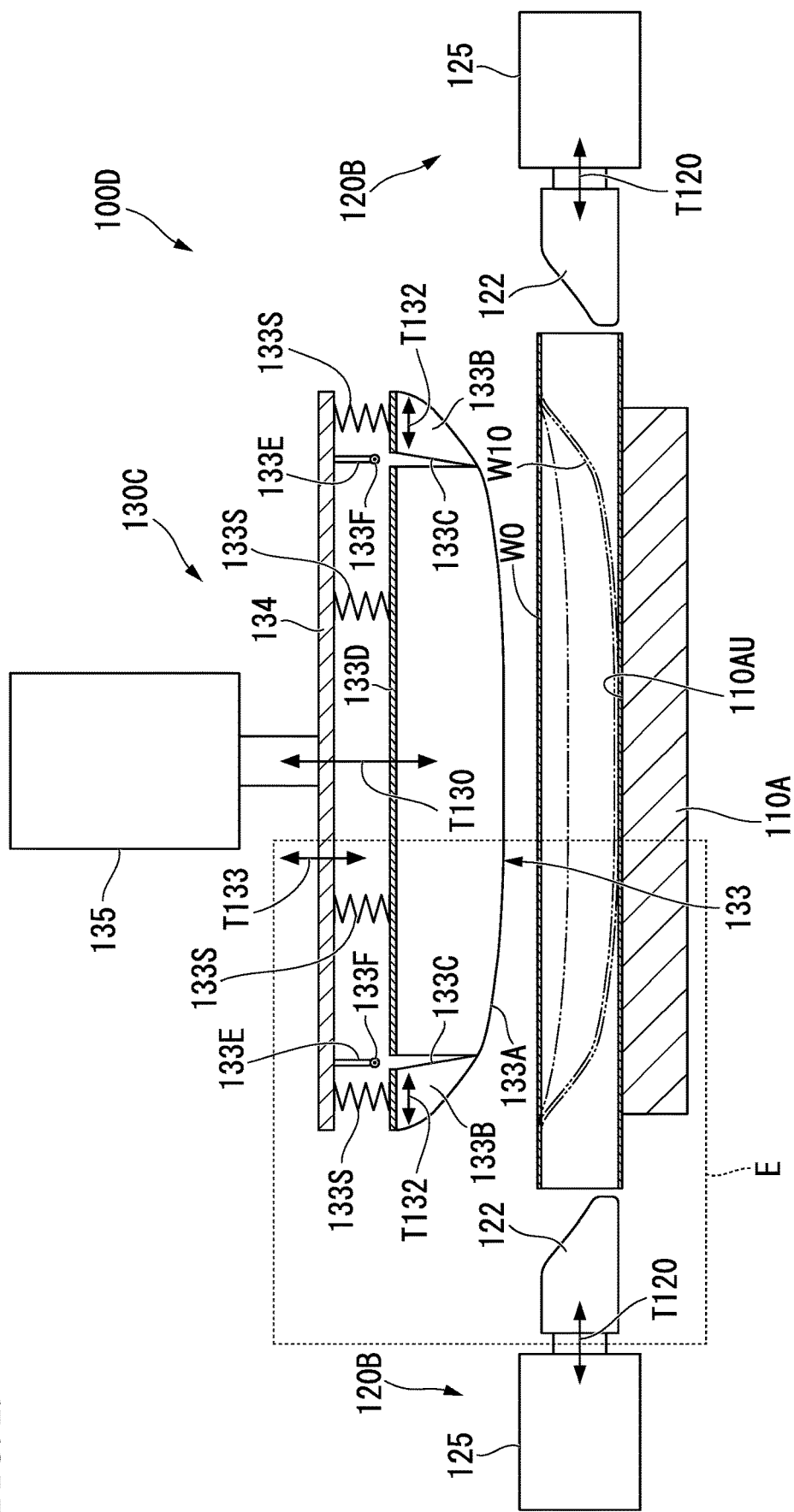
FIG. 19 is a front view describing a schematic configuration of a torsion beam manufacturing apparatus according to a fifth embodiment of the present invention.
Figure 20:
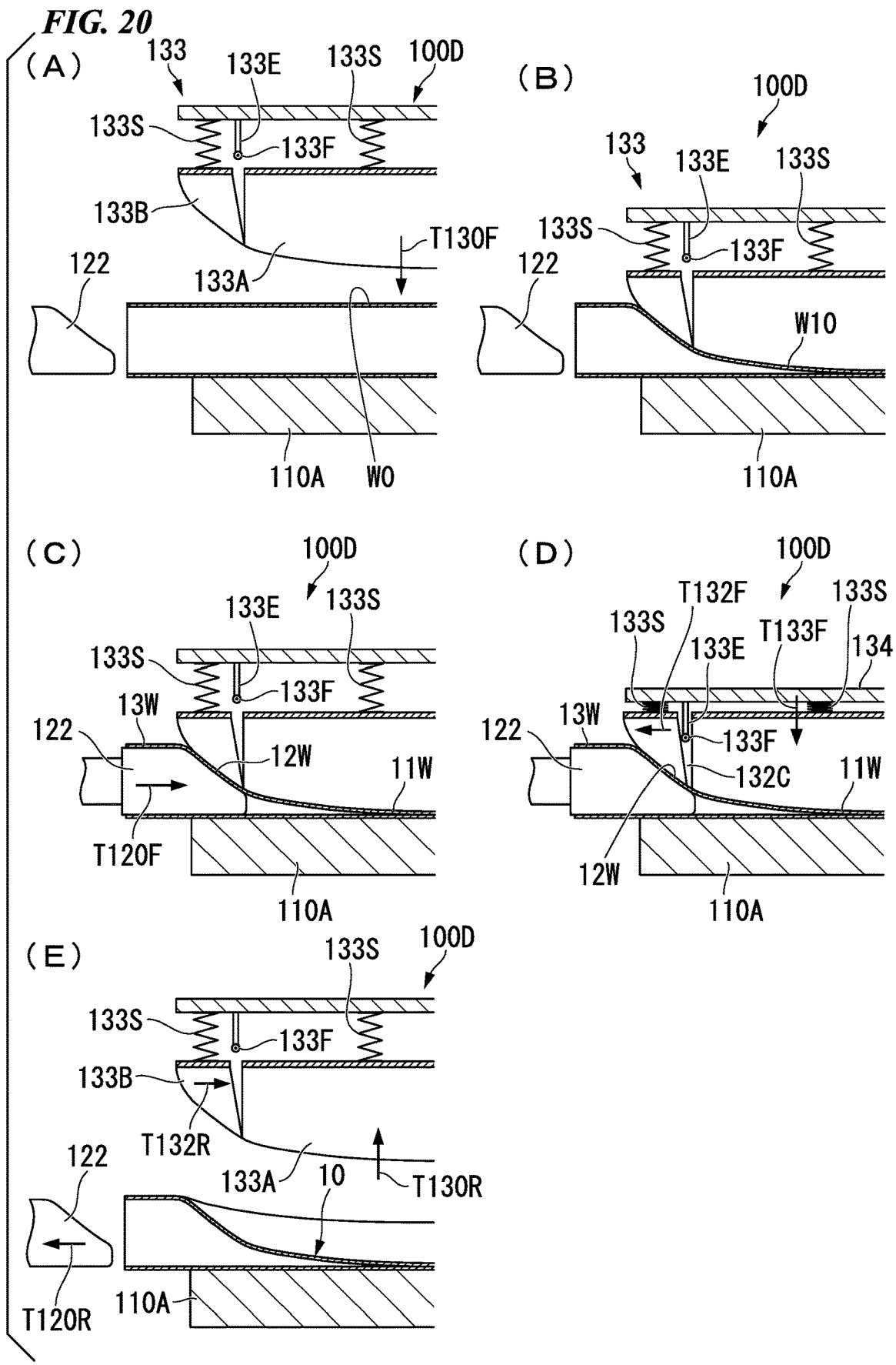
FIG. 20 is a view describing a step for manufacturing a torsion beam according to the same embodiment along a flow in FIGS. 20(A) to 20(E) and is a view corresponding to E-section in FIG. 19.

FIG. 19 is a front view describing a schematic configuration of a torsion beam manufacturing apparatus 100D according to the present embodiment. FIGS. 20(A) to 20(E) are views describing a step for manufacturing a torsion beam according to the present embodiment along a flow in FIGS. 20(A) to 20(E) and are views corresponding to E-section in FIG. 19.

Hereinafter, with reference to FIG. 19, a schematic configuration of the torsion beam manufacturing apparatus 100D according to the present embodiment will be described.

The torsion beam manufacturing apparatus 100D includes the fixed press forming die (forming die) 110A, the pair of pulling treatment units 120B, a movable-type press forming driving apparatus 130C, and a control unit (not illustrated).

In the torsion beam manufacturing apparatus 100D, the fixed press forming die 110A and the movable-type press forming driving apparatus 130C constitute the press machine, and the pair of pulling treatment units 120B constitutes a pulling treatment machine.

The configuration and the operation of the fixed press forming die 110A are similar to those of the third embodiment and the configuration and the operation of the pulling treatment unit 120B are similar to those of the fourth embodiment. Therefore, the same reference signs are applied and duplicated description will be omitted.

The movable-type press forming driving apparatus 130C includes a movable press forming die (forming die) 133 and the hydraulic cylinder (driving unit) 135 which moves the movable press forming die 133 forward and rearward in the direction of the arrow T130 (upward and downward).

As illustrated in FIG. 19, the movable press forming die 133 includes a first forming portion 133A, two second forming dies (shape changing portion support members) 133B which are respectively disposed on both sides of the first forming portion 133A in the longitudinal direction, cam surfaces (cam mechanisms) 133C, a guide member 133D which guides the second forming portion 133B moving in the horizontal direction with respect to the first forming portion 133A, a movable press forming die base member 134, cam follower support members 133E, cam followers (cam mechanisms) 133F, springs 133S, and a reversion unit (not illustrated) which moves the second forming portion 133B to the first forming portion 133A side.

In addition, a shape corresponding to the upper shape of the torsion beam material W10 is formed on a lower surface of the movable press forming die 133, which performs press forming of the torsion beam material W10 in cooperation with the fixed press forming die 110A.

The cam surface 133C is an inclination surface which is formed on an inner side surface of the second forming portion 133B, and of which a side away from the cam follower 133F is inclined so as to approach the first forming portion 133A. Then, a gap formed between the cam follower 133F and a surface facing thereof is tapered toward the movable press forming die 133 in a pressing direction.

The cam follower support member 133E is formed to extend toward the cam surface 133C side from the lower surface of the movable press forming die base member 134.

For example, the cam follower 133F is constituted of a roller and is rotatably provided on a tip end side of the cam follower support member 133E.

The cam surface 133C and the cam follower 133F constitute a cam mechanism moving the second forming portion 133B in the longitudinal direction of the torsion beam material W10.

A plurality of springs 133S are provided between the guide member 133D and the movable press forming die base member 134. After the torsion beam material W10 is formed by the first forming portion 133A and the second forming portion 133B, the movable press forming die base member 134 is further moved downward, so that the distance between the movable press forming die base member 134 and the guide member 133D changes and the position of the cam follower 133F can be displaced with respect to the cam surface 133C.

The control unit (not illustrated) instructs the pulling treatment unit 120B and the movable-type press forming driving apparatus 130C to perform an operation related to press working and pulling treatment.

Hereinafter, with reference to FIGS. 20(A) to 20(B), an overview of the torsion beam manufacturing step performed by the torsion beam manufacturing apparatus 100D will be described. FIGS. 20(A) to 20(E) are views describing the step for manufacturing a torsion beam according to the fifth embodiment along a flow in FIGS. 20(A) to 20(E) and are views corresponding to E-section in FIG. 19.

(1) First, as illustrated in FIG. 20(A), the metal material pipe W0 is placed on the fixed press forming die 110A, and the movable press forming die 133 is moved in the direction of the arrow T130F.

(2) As illustrated in FIG. 20(B), the torsion beam material W10 is formed through press forming using the fixed press forming die 110A and the movable press forming die 133.

(3) Next, as illustrated in FIG. 20(C), the shape changing portion support punch 122 is moved forward in the direction of the arrow T120P.

(4) Subsequently, as illustrated in FIG. 20(D), when the shape changing portion support punch 122 abuts on the inner side of the shape changing portion 12W of the torsion beam material W10, the movable press forming die base member 134 is further moved downward in a direction of an arrow T133F.

When the movable press forming die base member 134 is further moved downward in the direction of the arrow T133F, the cam follower 133F abuts on the cam surface 133C and the cam follower 133F moves along the cam surface 133C, so that the second forming portion 133B is moved forward in a direction of an arrow T132F. As a result, the torsion beam 10 is formed by pulling the torsion beam material W10 in its longitudinal direction in a state where the shape changing portion 12W is supported by the shape changing portion support punch 122 and the second forming portion 133B. In this pulling treatment, the distortion equal to or greater than 1% is applied to the torsion beam material W10 in its axial direction, so that tensile residual stress on the outer and inner surfaces in the sheet thickness direction can he reliably released.

(5) When the torsion beam 10 is formed, as illustrated in FIG. 20(E), the movable press forming die base member 134 is moved upward in the direction of the arrow T130R, and the movable press forming die base member 134 is separated from a first forming portion 133A and the second forming portion 133B. Accordingly, the cam follower 133F moves to an upper side of the cam surface 133C and the second forming die retreats in the direction of the arrow T132R by a second forming die reversion unit (not illustrated).

In addition, the shape changing portion support punch 122 is caused to retreat in the direction of the arrow T120R.

According to the torsion beam manufacturing method and the torsion beam manufacturing apparatus 100D of the fifth embodiment, the torsion beam 10 having excellent fatigue properties can be efficiently manufactured.

In addition, according to the torsion beam manufacturing apparatus 100D, the cam mechanism operates in accordance with strokes for moving the movable press forming die 133 in the direction of the arrow T130F. Then, the torsion beam material W10 is pulled outward in the longitudinal direction in a state where the shape changing portion support punch 122 and the second forming portion 133B hold the shape changing portion 12W. Therefore, residual stress can be efficiently reduced or removed from the connection portion 12A.

In addition, according to the torsion beam manufacturing apparatus 100D, after the metal material pipe W0 is pressed and the torsion beam material W10 is formed, the torsion beam material W10 is pulled in succession without being transferred to another apparatus. Therefore, productivity of manufacturing the torsion beam 10 can be improved.

In addition, according to the torsion beam manufacturing apparatus 100D, since the second forming portion 133B is moved forward in a direction of an arrow T133 by the cam mechanism, the second forming portion 133B can be operated with a simple structure.

The present invention is not limited to only each of the embodiments described above, and various changes can be made within a range not departing from the gist of the present invention.

For example, the first embodiment has described a case where the torsion beam manufacturing apparatus 100 holds the vicinity of the attachment portion 14 of the attachment closed cross-sectional portion 13W using the attachment closed cross-sectional portion holding member 121, and the torsion beam material W10 is pulled in the longitudinal direction. However, the present invention is not limited to only this form. The configuration of the attachment closed cross-sectional portion holding member 121 and the position at which the torsion beam material W10 is held can be set in any manner within a range in which the connection portion 12A can be pulled.

In addition, each of the embodiments has described a case where each of the movable press forming dies (forming dies) 131, 132, and 133 moves forward and rearward by the hydraulic cylinder 135. For example, a configuration of moving forward and rearward by an actuator other than a crank mechanism or a hydraulic cylinder (not illustrated) may be employed.

In addition, the first and third embodiments have described cases where the torsion beam manufacturing apparatuses 100 and 100B hold the attachment closed cross-sectional portion 13W using the attachment closed cross-sectional portion holding member 121, and the torsion beam material W10 is pulled in the longitudinal direction by the hydraulic cylinder (driving unit) 125. However, the present invention is not limited to only this form. The configuration of the attachment closed cross-sectional portion holding member 121, the position to be held by the attachment closed cross-sectional portion holding member 121, and the configuration of the driving unit can be set in any manner as long as the connection portion 12A can be pulled.

In addition, the second and fourth embodiments have described cases where the torsion beam manufacturing apparatuses 100A and 100C hold the shape changing portion 12W using the second forming portions 132B and 133B and the shape changing portion support punch (inside support member) 122, and the torsion beam material W10 is pulled in the longitudinal direction. In addition, a case where the torsion beam manufacturing apparatus 100B holds the shape changing portion 12W using the shape changing portion outside holding member 1210 and the shape changing portion support punch (inside support member) 122, and the torsion beam material W10 is pulled in the longitudinal direction has described. However, the present invention is not limited to only these forms. The configuration of the holding member for holding the shape changing portion 12W, the position at which the torsion beam material W10 is held, and the configuration of the driving unit can be set in any manner as long as the connection portion 12A can be pulled.

In addition, the second embodiment has described a case where the shape changing portion outside holding member 1210 includes the upper exterior shape holding portion 1211 and the lower exterior shape holding portion 1212. However, for example, the shape changing portion outside holding member 1210 may be divided into three or more sections when seen along the longitudinal direction of the torsion beam material W10.

In addition, the second embodiment has described a case where the shape changing portion outside holding member 1210 holds the shape changing portion 12W and the attachment closed cross-sectional portion 13W. However, only the shape changing portion 12W may be held as long as the connection portion 12A can be pulled.

In addition, the second embodiment has described a case where the upper exterior shape holding portion 1211 and the lower exterior shape holding portion 1212 respectively include the exterior shape holding shapes which are formed complementarity to both the shape changing portion 12W and the attachment closed cross-sectional portion 13W. However, the present invention is not limited to only this form. The exterior shape holding shapes may be formed complementarily to only parts of the exterior shapes of the shape changing portion 12W and the attachment closed cross-sectional portion 13W within a range in which the connection portion 12A can be pulled, and the exterior shape holding shape portion can be set in any manner.

In addition, the fourth embodiment has described a case where the torsion beam manufacturing apparatus 100C includes the actuator (shape change absorption unit) 113B. However, whether or not to include the actuator 113B can be set in any manner. In addition, the torsion beam manufacturing apparatus of a different embodiment may include the actuator 113B.

In addition, whether or not to cause operations of the shape changing portion support punch (inside support member) 122, the actuator 113B, and the hydraulic cylinders (shape changing portion support member driving units) 132C to be synchronized with or to follow each other can be set in any manner.

In addition, each of the embodiments has described a case where the first wall portion S110A constituting the uniformly shaped closed cross-sectional portion 11 and the inner side of the closed cross section of the second wall portion S120 are formed to be in tight contact with each other. However, whether or not to cause the first wall portion S110A and the inner side of the second wall portion S120 to be in tight contact with each other can be set in any manner.

In addition, each of the embodiments has described a case where the torsion beam 10 has a substantial V-shape projected to a lower side in a case of being mounted in the vehicle body. However, the embodiments may be applied to a torsion beam formed into a substantial U-shape and may employ a configuration of protruding to an upper side with respect to the vehicle body.

In addition, each of the embodiments has described a case where the metal material pipe W0, which is used when the torsion beam material W10 is formed, is a rounded steel pipe having a uniform thickness. As the metal material pipe W0, for example, a metal pipe which is formed by performing deformation processing of a welded pipe formed by performing press forming or roll forming of a steel sheet (metal material sheet) in which a fatigue relaxation thick shape corresponding portion is formed, or a metal pipe which is formed through extrusion forming or drawing forming may be used.

In addition, each of the embodiments has described a case where the metal material pipe used for manufacturing the torsion beam 10 is a steel pipe. However, the metal material pipe may be a metal pipe other than a steel pipe.

In addition, each of the embodiments has described a case where the attachment closed cross-sectional portion 13 has a straight shape in the longitudinal direction as illustrated in FIG. 4. However, the attachment closed cross-sectional portion 13 may have a stepped shape. That is, the embodiments may employ a modification example in which a step is formed first with respect to the attachment closed cross-sectional portion 13 and a tensile force is subsequently applied in a state where the shape changing portion outside holding member 1210 is locked in this step.

A case where the modification example is applied to the second embodiment will be described. First, as illustrated in FIG. 21A, a shape changing portion support punch 122A (inner side support member) is thrust into an end portion of the torsion beam material W10. The shape changing portion support punch 122A includes a tip end portion 122A1 having a relatively small outer diameter size, a base end portion 122A2 having a relatively large outer diameter size, and a stepped portion 122A3 formed between the tip end portion 122A1 and the base end portion 122A2. The outer diameter size of the tip end portion 122A1 is a size to be able to be inserted into the attachment closed cross-sectional portion 13. On the other hand, the outer diameter size of the base end portion 122A2 is slightly larger than the inner diameter size of the attachment closed cross-sectional portion 13.

Since the shape changing portion support punch 122A has such a stepped shape, when the shape changing portion support punch 122A is thrust into the attachment closed cross-sectional portion 13 as described above, the attachment portion 14 which is the pipe end of the attachment closed cross-sectional portion 13 is increased in diameter by the stepped portion 122A3 and the base end portion 122A2. As a result, as illustrated in FIG. 21(A), the outer diameter size of a part of the attachment portion 14 in the attachment closed cross-sectional portion 13 becomes larger than those of other parts, so that a locking portion st is formed.

Subsequently, the attachment closed cross-sectional portion 13 is interposed by the upper exterior shape holding portion 1211 and the lower exterior shape holding portion 1212 from above and below. In this case, the upper exterior shape holding portion 1211 and the lower exterior shape holding portion 1212 are positioned in advance such that the locking portion st is not squashed.

Subsequently, as illustrated in FIG. 21(B), the upper exterior shape holding portion 1211, the lower exterior shape holding portion 1212, and the shape changing portion support punch 122A are synchronously moved in a direction separated from the uniformly shaped closed cross-sectional portion 11. Then, each of side end surfaces 1211a and 1212a of the upper exterior shape holding portion 1211 and the lower exterior shape holding portion 1212 is locked in the locking-portion st. Therefore, a tensile force by the upper exterior shape holding portion 1211 and the lower exterior shape holding portion 1212 can be reliably applied to at least the connection portion 12A of the torsion beam material W10.

Moreover, in the second embodiment, a gripping force is set to be strong such that the torsion beam material W10 does not slide with respect to the upper exterior shape holding portion 1211 and the lower exterior shape holding portion 1212 when being pulled. Then, the shape changing portion support punch 122 is used together as a cove such that the torsion beam material W10 is not excessively distorted even if a gripping force is received. In contrast, in the present modification example, since the attachment closed cross-sectional portion 13 is pulled mainly by locking instead of friction, even if a gripping force by the upper exterior shape holding portion 1211 and the lower exterior shape holding portion 1212 is relatively weakened, a tensile force can be reliably applied. Therefore, since there is no need to use the shape changing portion support punch 122 together as a core, usage of the shape changing portion support punch 122 can be omitted when a tensile force is applied as in FIG. 21(B). The locking portion st maybe formed on the torsion beam manufacturing apparatus or may be formed in advance before being placed on the torsion beam manufacturing apparatus.

In the description above, a case where the present modification example is applied to the second embodiment has been described. However, it is natural that the present modification example can also be applied to other embodiments.

Essentials of the present invention based on each of the above-described embodiments will be summarized below.

(1) According to an aspect of the present invention, there is provided a method of manufacturing a torsion beam 10 that includes the uniformly shaped closed cross-sectional portion 11 of which a cross section orthogonal to a longitudinal direction is a closed cross section having a substantial V-shape or a substantial U-shape at any position in the longitudinal direction, and the shape changing portion 12 which has the connection portion 12A (connection region) leading to the uniformly shaped closed cross-sectional portion 11 and including a closed cross section having a shape different from the shape of the closed cross section of the uniformly shaped, closed cross-sectional portion. Then, for example, as illustrated in FIGS. 8(A) to 8(E), the torsion beam manufacturing method includes pulling process for obtaining the torsion beam 10 by applying a tensile force in the longitudinal direction with respect to at least the connection portion 12A of the torsion beam material W10 in which the uniformly shaped closed cross-sectional portion 11 and the shape changing portion 12 are formed.

In the torsion beam manufacturing method according to the aspect, since the tensile force is applied to at least the connection portion 12A during the pulling, remaining residual stress can be reduced or removed.

As a result the torsion beam 10 having excellent fatigue properties can be manufactured. Furthermore, since post-treatment such as heat treatment is not necessary, manufacturing can be efficiently performed.

(2) For example, as illustrated in FIGS. 13(A) to 13(D), in the pulling process, the tensile force may be applied by moving the shape changing portion support punch 122 and the upper exterior shape holding portion 1211 in a direction away from the uniformly shaped closed cross-sectional portion 11 in a state where an inner side of the outside part of the connection portion 12A in the longitudinal direction is supported by the shape changing portion support punch 122 (inner side support member) and the upper exterior shape holding portion 1211 (outer locking member) is locked on an outer side of the outside part.

In this case, during the pulling process, since the tensile force is applied after the inner side of the outside part of the torsion beam material W10 is supported by the shape changing portion support punch 122 and the upper exterior shape holding portion 1211 is locked on the outer side of the outside part, distortion of the outside part is suppressed and the tensile force can be easily applied.

(3) For example, as illustrated, in FIGS. 13(A) to 13(D), in the pulling process, the outer side of the connection portion 12A may be supported by the lower exterior shape holding portion 1212 (outer support member), and the lower exterior shape holding portion 1212 may be moved synchronously with movement of the shape changing portion support punch 122 and the upper exterior shape holding portion 1211 in the same direction.

In this case, since the lower exterior shape holding portion 1212 moves synchronously with movement of the shape changing portion support punch 122 and the upper exterior shape holding portion 1211, extension of the torsion beam material W10 entailed in pulling is not hindered. Therefore, the tensile force can be reliably applied to the torsion beam material W10, and residual stress can be reliably reduced or removed.

(4) For example, as illustrated in FIGS. 8(A) to 8(E), in the pulling process, the tensile force may be applied over an entire length of the torsion beam material W10 by causing both ends of the torsion beam material W10 to be relatively separated from each other along the longitudinal direction.

In this case, since the torsion beam material W10 is pulled outward in the longitudinal direction over the entire length thereof residual stress can be reduced or removed without omission.

(5) As described above in each of the embodiments, in the pulling process, distortion equal to or greater than 1% maybe applied to at least the connection portion 12A of the torsion beam material W10 in the longitudinal direction.

In this case, it is possible to apply the tensile force sufficient for removing or reducing residual stress of the torsion beam material W10.

(6) For example, as illustrated in FIGS. 16(A) to 16(C), the torsion beam manufacturing method may further include pressing process for obtaining the torsion beam material W10 by pressing the metal material pipe W0 (raw pipe), before the pulling process.

In this case, although residual stress is remaining in the torsion beam material W10 at the point of time alter the pressing process, the residual stress can be removed in the successive pulling process.

(7) For example, as illustrated in FIG. 15, according to another aspect of the present invention, there is provided the apparatus for manufacturing a torsion beam 10 including the uniformly shaped closed cross-sectional portion 11 of which a cross section orthogonal to a longitudinal direction is a closed cross section having a substantial V-shape or a substantial U-shape at any position in the longitudinal direction, and the shape changing portion 12 which has the connection portion 12A (connection region) leading to the uniformly shaped closed cross-sectional portion 11 and including a closed cross section having a shape different from the shape of the closed cross section of the uniformly shaped closed cross-sectional portion 11. Then, the torsion beam manufacturing apparatus 100B includes the pair of pulling treatment units 120 (holding mechanisms) that holds the part on one side of the connection portion 12A (connection region) and a part on the other side of the connection portion 12A in a case of being seen along the longitudinal direction of the torsion beam material W10 in the torsion beam material W10 in which the uniformly shaped closed cross-sectional portion 11 and the shape changing portion 12 are formed, and the hydraulic cylinder 125 (first driving mechanism) that causes the pulling treatment units 120 to be relatively separated from each other.

In the torsion beam manufacturing apparatus 100B according to the aspect, since the pair of pulling treatment units 120 and the hydraulic cylinder 125 apply a tensile force in the longitudinal direction to at least the connection portion 12A (connection region) in the torsion beam material W10, residual stress remaining in the torsion beam material W10 can be reduced or removed.

As a result, a torsion beam 10 having excellent fatigue properties can be manufactured. Furthermore, since post-treatment such as heat treatment is not necessary, manufacturing can be efficiently performed.

(8) For example, as in the torsion beam manufacturing apparatus 100B illustrated in FIG. 15, the pulling treatment units 120 may respectively hold both ends of the torsion beam material W10.

In this case, since both ends of the torsion beam material W10 are pulled while being held by the pair of pulling treatment units 120, the tensile force can be applied over the entire length of the torsion beam material W10. Therefore, residual stress can be reduced or removed without omission over the entire length of the torsion beam material W10.

(9) For example, as in the torsion beam manufacturing apparatus 100B of FIG. 15, it may further include the movable press forming die 131 (movable die) that has a shape corresponding to the uniformly shaped closed cross-sectional portion 11 and the shape changing portion 12, and the hydraulic cylinder 135 (second driving mechanism) that pressurizes the movable press forming die 131 with respect to a metal material pipe W0 (raw pipe) before the uniformly shaped closed cross-sectional portion 11 and the shape changing portion 12 are formed in the torsion beam material W10.

In this case, since the hydraulic cylinder 135 pressurizes the movable press forming die 131 with respect to the metal material pipe W0, the torsion beam material W10 having the uniformly shaped closed cross-sectional portion 11 and the shape changing portion 12 can be obtained.

(10) For example, as in the torsion beam manufacturing apparatus 100C illustrated in FIG. 17, at least one of the pulling treatment units 120 (holding mechanisms) may include the shape changing portion support punch 122 (inner side support member) which is inserted into an inner side of the shape changing portion 12, and the second forming portion 132B (outer locking member) which is locked on an outer side of the shape changing portion 12.

In this case, since the tensile force can be applied after the inner side of the shape changing portion 12 of the torsion beam material W10 is supported by the shape changing portion support punch 122 and the second forming portion 132B is locked on the outer side of the shape changing portion 12, distortion of the shape changing portion 12 is suppressed and the tensile force can be easily applied.

(11) For example, the torsion beam manufacturing apparatus 100C illustrated in FIG. 17 may employ the following configuration. The movable press forming die 132 (movable die) is provided with the first forming portion 132A (movable die main body portion) which has a shape corresponding to at least the uniformly shaped closed cross-sectional portion 11, the second forming dies 132B (movable die end portion) which have a shape corresponding to at least the shape changing portion 12 and are provided to be freely separated from the first forming portion 132A, and the hydraulic cylinders 132C (third driving mechanism) which cause the second forming dies 132B to be separated from the first forming portion 132A. The second forming dies 132B also serve as the outer locking member.

In this case, with respect to the metal material pipe W0 (raw pipe) pressed by the movable press forming die 132, the first forming portion 132A applies the shape corresponding to at least the uniformly shaped closed cross-sectional portion 11 and the second forming dies 132B apply the shape corresponding to at least the shape changing portions 12. In a state where the shape changing portion support punches 122 are inserted into the inner side of the shape-changing portions 12 of the torsion beam material W10 obtained in such a manner and the second forming dies 132B are locked on the outer side of the shape changing portions 12, the tensile force is applied to the torsion beam material W10.

According to this configuration, since the second forming dies 132B also serve as the outer locking member, the tensile force can be continuously applied without transferring the torsion beam material W10 to another apparatus.

(12) For example, as in the torsion beam manufacturing apparatus 100D illustrated in FIG. 19, the third driving mechanism may be the cam follower 133F (cam) which is inserted into a gap between an end portion of the first forming portion 132A and the second forming dies 132B.

In this case, first, the metal material pipe W0 is pressed by the first forming portion 133A and the second forming portion 133B and is processed into the torsion beam material W10. Subsequently, the cam follower 133F is thrust into the gap, so that the gap between the first forming portion 133A and the second forming portion 133B is widened. Then, the second forming portion 133B moves in a direction separated from the first forming portion 133A. Accordingly, the tensile force is applied to the torsion beam material W10, so that residual stress can be reduced or removed.

(13) For example, as in the torsion beam manufacturing apparatus 100C illustrated in FIG. 17, the following configuration may be employed. The torsion beam manufacturing apparatus 100C further includes die fixed press forming die 110B (support die) that supports the torsion beam material W10. The fixed press forming die 110B is provided with the first support-portion 111B (support die main body portion) which supports the torsion beam material W10 in a part including the uniformly shaped closed cross-sectional portion 11, and the second support portions 112B (support die end portion) which is provided to be freely separated from the first support portion 111B and supports at least the shape changing portion 12.

In this case, when the tensile force is applied to the torsion beam material 10, since the second support portions 112B is freely separated from the first support portion 111B, extension of the torsion beam material W10 entailed in pulling is not hindered. Therefore, the tensile force can be reliably applied to the torsion beam material W10, and residual stress can be reliably reduced or removed.

(14) Each of the embodiments may employ the following configuration further including a control unit that controls the hydraulic cylinder 125. The control unit operates the hydraulic cylinder 125 and applies distortion equal to or greater than 1% to at least the connection portion 12A of the torsion beam material W10 in the longitudinal direction.

In this case, it is possible to apply the tensile force sufficient for removing or reducing residual stress of the torsion beam material W10.

INDUSTRIAL APPLICABILITY

In the torsion beam manufacturing method and the torsion beam manufacturing apparatus according to the present invention, a torsion beam having excellent fatigue properties can be efficiently manufactured, so that industrial applicability thereof is significant.

BRIEF DESCRIPTION OF THE REFERENCE SYMBOLS

10 TORSION BEAM
11 UNIFORMLY SHAPED CLOSED CROSS-SECTIONAL PORTION
12 SHAPE CHANGING PORTION
12A CONNECTION PORTION (CONNECTION REGION)

100, 100A, 100B, 100C, 100D TORSION BEAM MANUFACTURING APPARATUS
110B FIXED PRESS FORMING DIE (SUPPORT DIE)
111B FIRST SUPPORT PORTION (SUPPORT DIE MAIN BODY PORTION)
112B SECOND SUPPORT PORTION (SUPPORT DIE END PORTION)
120, 120A, 120B PULL TREATMENT UNIT (HOLDING MECHANISM)
121B, 121C CLAMPING MEMBER (PINCHING PORTION)
122 SHAPE CHANGING PORTION SUPPORT PUNCH (INNER SIDE SUPPORT MEMBER)
125 HYDRAULIC CYLINDER (FIRST DRIVING MECHANISM)
131, 132, 133 MOVABLE PRESS FORMING DIE (MOVABLE DIE)
132A FIRST FORMING PORTION (MOVABLE DIE MAIN BODY PORTION)
132B SECOND FORMING PORTION (OUTER LOCKING MEMBER, MOVABLE DIE END PORTION)
133F CAM FOLLOWER (THIRD DRIVING MECHANISM, CAM)
135 HYDRAULIC CYLINDER (SECOND DRIVING MECHANISM)
1211 UPPER EXTERIOR SHAPE HOLDING PORTION (OUTER LOCKING MEMBER)
1212 LOWER EXTERIOR SHAPE HOLDING PORTION (OUTER SUPPORT MEMBER)
W0 METAL MATERIAL PIPE (RAW PIPE)
W10 TORSION BEAM MATERIAL

The invention claimed is:

1. A torsion beam manufacturing method for manufacturing a torsion beam including a uniformly shaped closed cross-sectional portion of which a cross section orthogonal to a longitudinal direction is a closed cross section having a substantial V-shape or a substantial U-shape at any position in the longitudinal direction, and a shape changing portion which has a connection region leading to the uniformly shaped closed cross-sectional portion and including a closed cross section having a shape different from the shape of the closed cross section of the uniformly shaped closed cross-sectional portion, the torsion beam manufacturing method comprising:
pulling process of applying a tensile force in the longitudinal direction to at least the connection region of a torsion beam material including the uniformly shaped closed cross-sectional portion and the shape changing portion, to obtain the torsion beam.

2. The torsion beam manufacturing method according to claim 1,
wherein in the pulling process, the tensile force is applied by moving an inner side support member and an outer locking member in a direction separated from the uniformly shaped closed cross-sectional portion in a state where an inner side of an outside part of the connection region in the longitudinal direction is supported by the inner side support member and the outer locking member is locked on an outer side of the outside part.

3. The torsion beam manufacturing method according to claim 2,
wherein in the pulling process, the outer side of the connection region is supported by an outer support member, and the outer support member is moved synchronously with movement of the inner side support member and the outer locking member in the same direction.

4. The torsion beam manufacturing method according to claim 1,
wherein in the pulling process, the tensile force is applied across an entire length of the torsion beam material by causing both ends of the torsion beam material to be relatively separated from each other along the longitudinal direction.

5. The torsion beam manufacturing method according to claim 1,
wherein in the pulling process, distortion equal to or greater than 1% is applied to at least the connection region of the torsion beam material in the longitudinal direction.

6. The torsion beam manufacturing method according to claim 1, further comprising:
pressing process of obtaining the torsion beam material by pressing a raw pipe, before the pulling process.

7. A torsion beam manufacturing apparatus for manufacturing a torsion beam including a uniformly shaped closed cross-sectional portion of which a cross section orthogonal to a longitudinal direction is a closed cross section having a substantial V-shape or a substantial U-shape at any position in the longitudinal direction, and a shape changing portion which has a connection region leading to the uniformly shaped closed cross-sectional portion and including a closed cross section having a shape different from the shape of the closed cross section of the uniformly shaped closed cross-sectional portion, the torsion beam manufacturing apparatus comprising:
a pair of holding mechanisms that holds one portion located more than one side of the connection region and another portion located more than another side of the connection region in a view seen along the longitudinal direction of a torsion beam material, in the torsion beam material including the uniformly shaped closed cross-sectional portion and the shape changing portion; and
a first driving mechanism that causes the holding mechanisms to be relatively separated from each other.

8. The torsion beam manufacturing apparatus according to claim 7,
wherein the holding mechanisms respectively hold both ends of the torsion beam material.

9. The torsion beam manufacturing apparatus according to claim 8, further comprising:
a movable die that has a shape corresponding to the uniformly shaped closed cross-sectional portion and the shape changing portion; and
a second driving mechanism that presses the movable die with respect to a raw pipe which is before forming the uniformly shaped closed cross-sectional portion and the shape changing portion in the torsion beam material.

10. The torsion beam manufacturing apparatus according to claim 7,
wherein at least one of the holding mechanisms includes an inner side support member which is inserted into an inner side of the shape changing portion, and an outer locking member which is locked on an outer side of the shape changing portion.

11. The torsion beam manufacturing apparatus according to claim 10, further comprising:
a movable die that has a shape corresponding to the uniformly shaped closed cross-sectional portion and the shape changing portion; and
a second driving mechanism that presses the movable die with respect to a raw pipe which is before forming the uniformly shaped closed cross-sectional portion and the shape changing portion in the torsion beam material.

12. The torsion beam manufacturing apparatus according to claim 11,
wherein the movable die is provided with a movable die main body portion which has a shape corresponding to at least the uniformly shaped closed cross-sectional portion, a movable die end portion which has a shape corresponding to at least the shape changing portion and is provided so as to be freely separated from the movable die main body portion, and a third driving mechanism which causes the movable die end portion to be separated from the movable die main body portion, and
wherein the movable die end portion also serves as the outer locking member.

13. The torsion beam manufacturing apparatus according to claim 12,
wherein the third driving mechanism is a cam which is inserted into a gap between the movable die main body portion and the movable die end portion.

14. The torsion beam manufacturing apparatus according to claim 7, further comprising:
a support die that supports the torsion beam material,
wherein the support die is provided with a support die main body portion which supports the torsion beam material at a part including the uniformly shaped closed cross-sectional portion, and a support die end portion which is provided so as to be freely separated from the support die main body portion and supports at least the shape changing portion.

15. The torsion beam manufacturing apparatus according to claim 7, further comprising:
a control unit that controls the first driving mechanism,
wherein the control unit operates the first driving mechanism and applies distortion equal to or greater than 1% to at least the connection region of the torsion beam material in the longitudinal direction.

16. The torsion beam manufacturing method according to claim 2,
wherein in the pulling process, distortion equal to or greater than 1% is applied to at least the connection region of the torsion beam material in the longitudinal direction.

17. The torsion beam manufacturing method according to claim 3,
wherein in the pulling process, distortion equal to or greater than 1% is applied to at least the connection region of the torsion beam material in the longitudinal direction.

18. The torsion beam manufacturing method according to claim 4,
wherein in the pulling process, distortion equal to or greater than 1% is applied to at least the connection region of the torsion beam material in the longitudinal direction.

19. The torsion beam manufacturing apparatus according to claim 8, further comprising:
a control unit that controls the first driving mechanism, wherein the control unit operates the first driving mechanism and applies distortion equal to or greater than 1% to at least the connection region of the torsion beam material in the longitudinal direction.

20. The torsion beam manufacturing apparatus according to claim 10, further comprising:
a control unit that controls the first driving mechanism, wherein the control unit operates the first driving mechanism and applies distortion equal to or greater than 1% to at least the connection region of the torsion beam material in the longitudinal direction.

* * * * *